United States Patent
Onmori et al.

(10) Patent No.: US 7,221,540 B2
(45) Date of Patent: May 22, 2007

(54) RECORDING MEDIUM CARTRIDGE

(75) Inventors: Shozo Onmori, Kanagawa (JP); Kazuo Hiraguchi, Kanagawa (JP); Makoto Sato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 264 days.

(21) Appl. No.: 10/784,943

(22) Filed: Feb. 25, 2004

(65) Prior Publication Data
US 2004/0165313 A1    Aug. 26, 2004

Related U.S. Application Data

(62) Division of application No. 09/888,446, filed on Jun. 26, 2001, now Pat. No. 6,856,486.

(30) Foreign Application Priority Data

Jun. 26, 2000    (JP)    ............................. 2000-190788

(51) Int. Cl.
G11B 23/02    (2006.01)
(52) U.S. Cl. ..................................... 360/132
(58) Field of Classification Search ................ 360/132, 360/133
See application file for complete search history.

(56) References Cited

U.S. PATENT DOCUMENTS

| | | | |
|---|---|---|---|
| 4,345,285 A * | 8/1982 | DeMoss et al. ............. | 360/133 |
| 5,261,259 A * | 11/1993 | Ployd ........................... | 70/58 |
| 5,896,256 A | 4/1999 | Lang et al. | |
| 5,923,490 A * | 7/1999 | Joyce et al. ................ | 360/72.1 |
| 5,986,992 A | 11/1999 | Bardmesser | |
| 6,160,679 A * | 12/2000 | Maekawa et al. ........... | 360/132 |
| 6,304,416 B1 | 10/2001 | McAllister et al. | |
| 6,385,004 B1 | 5/2002 | Sanpei et al. | |
| 6,452,745 B1 * | 9/2002 | Shiga et al. ................ | 360/132 |
| 6,481,658 B1 * | 11/2002 | Shiga et al. ................ | 242/347 |
| 6,702,215 B2 * | 3/2004 | Stamm et al. .............. | 242/348 |
| 6,788,487 B2 * | 9/2004 | Unno ......................... | 360/72.1 |
| 2005/0152670 A1 * | 7/2005 | Skaar .......................... | 386/46 |

FOREIGN PATENT DOCUMENTS

| | | |
|---|---|---|
| EP | 61-196488 | 8/1986 |
| EP | 61-196489 | 8/1986 |

(Continued)

*Primary Examiner*—Allen Cao
(74) *Attorney, Agent, or Firm*—Sughrue Mion, PLLC

(57) ABSTRACT

The recording medium cartridge accommodates a recording medium such as a magnetic tape, a optical and/or magnetic disk, or the like in a cartridge body having an upper half and a lower half. A non-contact type memory device storing information, for example, given when producing the cartridge is provided in a reel of at least one of upper and lower flanges of a tape reel or on a surface facing to the tape winding surface of the body in the cartridge accommodating the tape reel wound with the tape, or in a recessed portion formed in at least one of a bottom surface of the lower half and an upper surface of a slider or in the slider in the cartridge having the slider, or in a transparent window of the body. A part of at least one of the upper and lower halves that corresponds to the memory device may be notched. The memory device may be welded together when fitting other members.

4 Claims, 10 Drawing Sheets

FOREIGN PATENT DOCUMENTS

| | | |
|---|---|---|
| EP | 0 874 367 A2 | 10/1998 |
| EP | 0 978 841 A2 | 2/2000 |
| JP | 7-334637 | 12/1995 |
| JP | 09-265759 | 3/1996 |
| JP | 11-317050 | 11/1999 |
| JP | 11-339439 | 12/1999 |
| JP | 2000-48531 | 2/2000 |
| JP | 2000-048532 | 2/2000 |
| JP | 2000-048547 | 2/2000 |

* cited by examiner

RECORDING MEDIUM CARTRIDGE

This is a divisional of Application Ser. No. 09/888,446 filed Jun. 26, 2001 now U.S. Pat. No. 6,856,486; the disclosure of which is incorporated herein by reference.

BACKGROUND OF THE INVENTION

The present invention generally relates to a recording medium cartridge such as a magnetic tape cartridge and more particularly to a recording medium cartridge such as a magnetic tape cartridge that is fitted with a non-contact type memory device capable of reading and writing various items of information in a non-contact manner. More specifically, the present invention relates generally to a recording medium cartridge for a magnetic tape, a magnetic disk or an optical recording medium, and more particularly to a recording medium cartridge fitted with a non-contact type memory device in such a form that information can be read therefrom and written thereto, for recording information given when producing the recording medium cartridge and information on contents of data recorded on the recording medium accommodated in the recording medium cartridge.

There have hitherto been known a variety of conventional magnetic tape cartridges such as a recording/reproducing tape cartridge used for a home- or official-use video tape recorder or a video camera, and, as a large capacity recording medium for a data backup in an external storage device (computer memory) such as a computer, a 2-reel type tape cartridge including a pair of take-up hubs wound with a magnetic tape and rotatably accommodated in a cartridge body (case) constructed of upper and lower halves, a 1-reel type tape cartridge accommodating rotatably a single tape take-up reel (tape reel) wound with the magnetic tape, and a disk type tape cartridge accommodating rotatably a single magnetic disk (or a magneto-optic disk). The variety of known magnetic tape cartridges are, for example, cartridges of such a type as to have openings of which structures and dimensional data are prescribed in JISX6127 (1992), JISX6129 (1993), JISX6130 (1996) and JISX6141 (1993) (which are hereinafter generically called a magnetic tape cartridge of which a structure and dimensional data are prescribed in JISX6127 (1992) and the like) and a cartridge of which a structure and dimensional data are prescribed in ECMA-288 and the like. The magnetic tape cartridges, especially those used as cartridges of recording mediums for storing the data of a computer and the like are recorded with important items of information such as backup data.

In those magnetic tape cartridges, if capable of specifying contents of the information recorded and types of the magnetic tapes without even reading the information from the magnetic tapes, this is effective in terms of storing and managing the magnetic tape cartridges and searching the recorded information. Especially in the magnetic tape cartridge used as a cartridge of the recording medium for storing the data of the computer and the like, if capable of simply recognizing only the general contents of the information recorded without accessing the magnetic tape, this is quite convenient. Under such circumstances, it is considered that a cartridge body and a cartridge case is attached with a non-contact type memory device (which will hereinafter also be referred to as a cartridge memory (CM)) including an IC memory capable of writing and reading the information in a non-contact manner. This non-contact type memory device itself does not have a power source and is operated by an induced current occurred by an electromagnetic inductive action of a data reading/writing unit provided on the side of a recording/reproducing device (deck).

In the case of attaching this non-contact type memory device to the cartridge body, the non-contact type memory device is normally disposed within the cartridge body in terms of increasing a degree of freedom of designing the magnetic tape recording/reproducing device of an external storage device and protecting the non-contact type memory device from an adhesion of dusts to this non-contact type memory device itself and an impact caused from outside. For instance, Japanese Patent Application Laid-open No. Hei 11-317050 discloses a 1-reel type magnetic tape cartridge with the non-contact type memory device, as shown in FIG. 22, incorporated into the cartridge body. This magnetic tape cartridge 160 is inserted into the recording/reproducing device (deck unillustrated) in an arrow direction A.

A non-contact type memory device 162 used in this example includes a data transmitting/receiving antenna 164 and a memory device 166. The memory device 166 is a storage device such as a conventional memory chip that is capable of electronically taking out the information, and is stored with information on the magnetic tape cartridge 160 or information related to contents thereof. The data transmitting/receiving antenna 164 is classified as a coil antenna having a function of converting a magnetic field emitted from an antenna of the data reading/writing unit provided inside the deck and supplying the electric power to the data transmitting/receiving antenna 164 itself and the memory device 166 as well, and transmitting digital data given from the memory device 166 to the antenna of the deck-sided data reading/writing unit. This data transmitting/receiving antenna 164 is fitted in the vicinity of a bottom surface 168 and a rear surface 170 inside the magnetic tape cartridge 160. The data transmitting/receiving antenna 164 is attached at an angle of approximately 45° to both of the bottom surface 168 and the rear surface 170 of the magnetic tape cartridge 160 in the example shown in FIG. 22.

A first problem inherent in the prior art is, however, that when the non-contact type memory device is disposed inwardly of the cartridge body accommodating main components such as a tape reel and a magnetio tape, there is received a large restraint due to a space where a variety of members are disposed in the cartridge body and a space for winding the magnetic tape, and also a restraint and a limit in terms of a degree of freedom of designing a layout position of the non-contact type memory device. Further, with these restraints, it follows that there is received a restraint in a degree of freedom of designing a layout position of the data reading/writing unit of the non-contact type memory device provided on the side of the external storage device.

On the other hand, if the non-contact type memory device is attached somewhere outside the magnetic tape cartridge, there might be a high possibility in which the non-contact type memory device is easy to have a damage by an external force when the magnetic tape cartridge is stored and carried and when loaded (attached) into and detached from the external storage device, and the non-contact type memory device might become an obstacle when attached (loaded) to and detached from the deck. Further, the non-contact type memory device might become a hindrance when loaded and detached and might come off carelessly. Namely, there is a high probability that the surface of the non-contact type memory device might be damaged when loaded and detached, and, if exposed to the outside; the non-contact type memory device might come off due to an unexpected state.

Further, a manufacture of the magnetic tape cartridge fitted with the conventional non-contact type memory device, involves the use of a member for fixing and a device for fitting the non-contact type memory device, and hence there is a necessity of specially providing a work for fitting the non-contact type memory device. This requirement might lead to a complicated process of manufacturing the magnetic tape cartridge.

Moreover, in addition to the variety of above-mentioned problems arising when the non-contact type memory device is disposed outside the magnetic tape cartridge or inside the cartridge body, a second problem inherent in the prior art is that if the non-contact type memory device is attached to the outside of the magnetic tape cartridge, the non-contact type memory device might be easy to receive an influence by a magnetic field occurred by devices other than the data reading/writing unit of the non-contact type memory device provided in the external storage device.

Still further, a third problem inherent in the prior art is that as in the case of the magnetic tape cartridge shown in FIG. 22, when the non-contact type memory device is packaged into the cartridge case, the non-contact type memory device must be, if a defect of the non-contact type memory device is detected by an operation check after assembling the magnetic tape cartridge, exchanged by deassembling the external casing of the magnetic tape cartridge assembled, and this turns out to be a factor of causing a decline of efficiency of the operation and eventually an increase in cost due to a rise in the number of inspection steps.

Moreover, the non-contact type memory device is an expensive member, and therefore, even though the non-contact type memory device has no problem, if a drawback to the magnetic tape cartridge is detected, or if the magnetic tape cartridge becomes unusable for some reason, a problem is that the non-contact type memory device must be take out if it is to be used again by deassembling the magnetic tape cartridge.

Further, when the non-contact type memory device is disposed outside the magnetic tape cartridge or inside the cartridge case, as a matter of course, there similarly exist the variety of problems described above.

Further, various items of information are recorded on a recording medium of the recording medium cartridge such as the magnetic tape cartridge shown in FIG. 22 and so on, however, an arrangement that the above-mentioned cartridge memory (CM) is attached in order to specify contents of the information recorded and a type of the recording medium without reading the information from the magnetic recording medium, is on the verge of its utilization.

By the way, the magnetic tape cartridge exemplified in the prior art is classified as a 1-reel type magnetic tape cartridge accommodating the magnetic tape, and therefore has a large degree of freedom in terms of a fitting area of the cartridge memory within the cartridge. By contrast, however, a fourth problem of the prior art is that the recording medium cartridge of which the structure and the dimensional data are prescribed in JISX6127 (1992) and the like has, because of the cartridge accommodating inside a couple of take-up hubs wound with the magnetic tape, an extremely small degree of freedom in terms of the fitting area of the cartridge memory within the cartridge.

Further, the recording medium cartridge of which the structure and the dimensional data are prescribed in JISX6127 (1992) and the like includes an optical detecting device using a prism, for detecting an existence (of leading and tail edges) of the magnetic tape by utilizing a transparent portion connected to both of side edges of the magnetic tape wound extending on the couple of take-up hubs.

Then, a member including the prism configuring this optical detecting device is normally composed of a material exhibiting an excellent light transmissivity but different from a material constituting the body (containing upper and lower halves, a slider and the like) of the recording medium cartridge. This member is fitted by thermal welding to a predetermined position within the lower half.

By the way, a fifth problem of the prior art is that the items of information recorded on the cartridge memory in the recording medium cartridge shown in the prior art described above, are limited to the contents of the data recorded in the recording medium cartridge. Namely, a concept that production conditions are one-dimensionally managed by recording the cartridge memory with types and tool serial numbers (device serial numbers) with respect to raw materials, devices, jigs and the like which were used in the process of producing the cartridge memory, was not seen in the conventional recording medium cartridges.

It is, however, highly effective in tracing the process afterward and a countermeasure for claims that a cartridge memory capable of writing and reading in a non-contact manner is incorporated at an early stage of the production process of the recording medium cartridge, and detailed information on the production process thereafter is recorded on this cartridge memory.

SUMMARY OF THE INVENTION

Accordingly, it is a first object of the present invention, which was devised to obviate the first problem inherent in the prior art, to provide a magnetic tape cartridge defined as a recording medium cartridge that can be easily manufactured in a conventional assembly process without requiring a special work, wherein a non-contact type memory device is hard to receive a damage by an external force caused when the magnetic tape cartridge is stored, carried, loaded and detached, and neither becomes an obstacle when attached and detached nor comes off carelessly, and it is possible to ensure a degree of freedom of designing the magnetic tape cartridge and a degree of freedom of designing a data reading/writing unit provided on the side of an external storage device.

It is a second object of the present invention, which was devised to obviate a second problem inherent in the prior art, to provide a magnetic tape cartridge defined as a recording medium wherein a non-contact type memory device is hard to receive a damage by an external force caused when the magnetic tape cartridge is stored, carried, loaded and detached, and does not become an obstacle when attached and detached, it is feasible to ensure a degree of freedom of designing the magnetic tape cartridge and a degree of freedom of designing a data reading/writing unit provided on the side of an external storage device, and it is hard to be influenced by a magnetic field occurred by devices other than the data reading/writing unit.

It is a third object of the present invention, which was devised to obviate a third problem inherent in the prior art, to provide a magnetic tape cartridge defined as a recording medium wherein a non-contact type memory device is attached to a bottom surface of a lower half configuring a cartridge case or to an upper surface of a slider and can be attached in a state of a single component of the lower half or the slider within the assembly process of the cartridge case, the non-contact type memory device can be inspected in the state of its being attached to this single component, therefore, even if some defect is detected, the defect can be detected on the unit of the single component without deassembling the cartridge, the non-contact type memory device is hard to receive a damage by an external force caused when the magnetic tape cartridge is stored, carried, loaded and detached, and does not become an obstacle when attached and detached, and it is feasible to ensure a degree of freedom of designing the magnetic tape cartridge and a degree of freedom of designing a data reading/writing unit provided on the side of an external storage device.

It is a fourth object of the present invention, which was devised to obviate a fourth problem inherent in the prior art, provide a recording medium cartridge in which a cartridge memory can be attached even when the recording medium cartridge has almost no space inside for fitting the cartridge memory.

It is another object of the present invention to provide a method by which a cartridge memory can be attached in a way that restrains, when the cartridge memory is fitted inside the recording medium cartridge, a decline of sensitivity of the cartridge memory attached as much as possible.

It is a fifth object of the present invention, which was devised to obviate a fifth problem inherent in the prior art, provide a recording medium cartridge in which a cartridge memory attached to the recording medium cartridge is recorded with detailed pieces of information on a production process thereafter, and the information can serve for use later on.

In order to attain the first object described above, the first aspect of the present invention provides a recording medium cartridge defined as a magnetic tape cartridge, comprising: a cartridge body; a tape reel accommodated in the cartridge body and wound with a magnetic tape, the tape reel having upper and lower flanges; and a non-contact type memory device disposed in a reel of at least one of the upper and lower flanges of the tape reel.

According to the present invention, a tape reel implies a feeding- or winding-side take-up hub in a 2-reel type magnetic tape cartridge, and indicates, in a 1-reel type magnetic tape cartridge, a tape reel serving as both of tape feeding and winding reels and provided in the cartridge body. Further, a position where the non-contact type memory device is provided within the reel of at least one of upper and lower flanges of the tape reel, indicates a position that does not impede tape winding and interfere with a reel driving shaft inserted into the cartridge body from a recording/reproducing device (deck) when using the magnetic tape cartridge, and impedes neither a rotation of this reel driving shaft nor a rotation of the take-up hub in a configuration and a structure of the take-up hub of the 2-reel type magnetic tape cartridge. Moreover, in the 1-reel type magnetic tape cartridge, the fitting position of the non-contact type memory device in the tape reel also indicates the same position as in the case of the 2-reel type magnetic tape cartridge.

Preferably, the tape is reel a take-up hub wound with the magnetic tape, and a position provided with the non-contact type memory device is a position that does not impede tape winding and interfere with a reel driving shaft inserted into the cartridge body from a recording/reproducing device when using the magnetic tape cartridge, and impedes neither a rotation of this reel driving shaft nor a rotation of the take-up hub in a configuration and a structure of the take-up hub.

Preferably, the non-contact type memory device disposed in the tape reel is attached to a predetermined position within the tape reel by use of an adhesive agent, or fixed to a predetermined position by insert molding when molding parts.

The present invention is not limited to embodiments which follow and can be applied with no restriction if being a magnetic tape cartridge with a cartridge body accommodating a tape reel wound with a magnetic tape. For instance, the present invention can be applied with no limit to the 1-reel type magnetic tape cartridge shown in FIG. 22 or a magnetic tape cartridge for a vide tape recorder and the like.

Moreover, a configuration and dimensions of components of the non-contact memory device used in the present invention may be properly determined depending on a type of the tape reel of the magnetic tape cartridge, to be more specific, a structure and type of the tape reel having or not having a flange, a winding mode of the tape reel such as a 1-reel type and a 2-reel type, and a layout mode of the respective members.

Further, according to the present invention, the non-contact type memory device provided in the tape reel may be attached to a predetermined position within the tape reel by a secondary device using an adhesive agent and the like, or may be fixed to the predetermined position by insert-molding and the like when molding the components.

In order to attain the second object described above, the second aspect of the present invention provides a recording medium cartridge defined as a magnetic tape cartridge, comprising: a cartridge body accommodating a magnetic tape; and a non-contact type memory device disposed on a surface facing to a tape winding surface of the cartridge body.

Preferably, the tape winding surface is a surface corresponding to an upper or lower surface of windings of the magnetic tape wound on the tape reel accommodated in the cartridge body, and the surface facing to the tape winding surface of the cartridge body is an external surface of an upper or lower half of the cartridge body, and is a surface positioned above or under the tape winding surface.

Preferably, the position where the non-contact type memory device is disposed is a position, not interfering with respective portions provided or members fitted to the upper and lower halves, on the surface facing to the tape winding surface.

In the magnetic tape cartridge according to the present invention, the tape winding surface is a surface corresponding to an upper or lower surface of windings of the magnetic tape wound on the tape reel accommodated in toe cartridge body.

The surface facing to the tape winding surface of the cartridge body is a surface positioned above or under the tape winding surface as well as being an external surface of the upper or lower half of the cartridge body. The above surface facing thereto is, for example, an upper surface outside the upper half of the cartridge body or a lower surface outside the lower half, and so forth.

Furthermore, the position where the non-contact type memory device is provided may be properly determined corresponding to the positions where the respective portions and members are provided in a way that does not interfere with the respective portions provided on the upper and lower halves or the members fitted thereto with respect to the surface facing to the tape winding surface.

The present invention is not confined to the embodiments which follow and can be applied with no restriction if being a magnetic tape cartridge with a cartridge body accommodating a tape reel wound with a magnetic tape. For instance, the present invention can be applied with no particular restriction to the 1-reel type magnetic tape cartridge shown in FIG. 22, or a magnetic tape cartridge for a video tape recorder (based on various specifications and standards such as DVDPRO, 8 mm, β-cam (including digital β-cam), D2, D3 and the like.)

Further, a configuration, a disposing position and dimensions of components of the non-contact memory device used in the present invention may be properly determined depending on a type of the tape reel of the magnetic tape cartridge, a type of the cartridge body and a layout mode of the respective members. For instance, it is preferable that the non-contact type memory device be thin in configuration so as not to increase a thickness of the cartridge body and particularly 1.0 mm or less in thickness.

The non-contact memory device used in the present invention is constructed of a memory device body, an antenna and a substrate, composed of a synthetic resin or paper and the like, on which these components are disposed. The memory device body may be disposed in any position on the substrate, and the position thereof is not particularly limited. Further, it is desirable that the antenna has a large area to the greatest possible degree and be, it is preferable, disposed at a central portion of the cartridge body so as not to receive an influence from a metallic member such as a metal plate.

In order to attain the third aspect described above, the third aspect of the present invention, provides a recording medium cartridge defined as a magnetic tape cartridge, comprising: a cartridge case, constructed of upper and lower halves, for accommodating a recording medium; a slider, so fitted as to slide on a bottom surface of the lower half, for protecting an opening in the bottom surface of the lower half; and a non-contact type memory device provided in a recessed portion formed in at least one of the bottom surface of the lower half and an upper surface of the slider.

In order to attain the fourth aspect described above, the fourth aspect of the present invention provides a recording medium cartridge, comprising: a case body constructed by joining an upper half and a lower half to each other; a slider having engagement slide members provided at both side ends thereof and slidably inserted into slide grooves formed, extending in front and rear directions of the case body, between right/left side walls of the upper half and right/left side walls of the lower half, and fitted along the bottom surface and the side surface of the lower half; and a cartridge memory, provided in the slider, for recording information on the recording medium cartridge and information on data recorded on the recording medium.

Moreover, the recording medium cartridge according to this aspect may be the one of which the structure and dimensional data are prescribed in any one of JISX6127 (1992), JISX6129 (1993), JISX6130 (1996) and JISX6141 (1993) or its equivalent.

Preferably, the cartridge memory is disposed on an internal surface of a recording medium turn preventive rib within the slider.

In order to attain the fourth object described above, the fifth aspect of the present invention provides a recording medium cartridge comprising: a cartridge case for accommodating a recording medium including a transparent window that is visually recognizable; and a cartridge memory, provided in the transparent window, for recording information on the recording medium cartridge and information on data recorded on the recording medium.

Preferably, the cartridge memory is formed on a transparent support substrate.

Moreover, the recording medium cartridge according to this aspect may be the one of which the structure and dimensional data are prescribed in any one of JISX6127 (1992), JISX6129 (1993), JISX6130 (1996) and JISX6141 (1993) or its equivalent.

Preferably, the cartridge memory is attached to a rear side of the transparent window.

Preferably, when attaching the cartridge memory, the cartridge memory is so fitted as to be set in a notch formed in a sheet positioning rib provided on the recording medium cartridge.

Preferably, a portion peripheral to a fitting position of the cartridge memory is recessed.

In order to attain the fourth object described above, the sixth aspect of the present invention provides a recording medium cartridge, comprising: a case body constructed by joining an upper half and a lower half to each other; a slider having engagement slide members provided at both side ends thereof and slidably inserted into slide grooves formed, extending in front and rear directions of the case body, between right/left side walls of the upper half and right/left side walls of the lower half, and fitted along a bottom surface and a side surface of the lower half; and a cartridge memory, provided inside, for recording information on the recording medium cartridge and information on data recorded on the recording medium, wherein a part of at least one of the upper and lower halves that corresponds to the cartridge memory, is notched.

Moreover, the recording medium cartridge according to this aspect may be the one of which the structure and dimensional data are prescribed in any one of JISX6127 (1992), JISX6129 (1993), JISX6130 (1996) and JISX6141 (1993) or its equivalent.

Preferably, in this aspect, the cartridge memory is disposed in a position facing to a space between two pieces of windings of a magnetic tape defined as a recording medium, which are provided on a rear surface side of the upper and lower halves.

In order to attain the fourth object described above, the seventh aspect of the present invention provides a recording medium cartridge defined as a magnetic tape cartridge, comprising: a case body constructed by joining an upper half and a lower half to each other; a slider having engagement slide members provided at both side ends thereof and slidably inserted into slide grooves formed, extending in front and rear directions of the case body, between right/left side walls of the upper half and right/left side walls of the lower half, and fitted along a bottom surface and a side surface of the lower half; and a cartridge memory, welded together when fitting other members, for recording information on the recording medium cartridge and information on data recorded on the recording medium.

Moreover, the recording medium cartridge according to this aspect may be the one of which the structure and dimensional data are prescribed in any one of JISX6127 (1992), JISX6129 (1993), JISX6130 (1996) and JISX6141 (1993) or its equivalent.

Preferably, in this aspect, the cartridge memory is welded together when fitting detecting device for detecting whether or not there is the recording medium provided in the recording medium cartridge.

Preferably, a base of the recording medium detecting device presses the cartridge memory from above against the recording medium cartridge.

Preferably, a periphery of a portion fitted with the cartridge memory is recessed corresponding to a shape of the cartridge memory.

In order to attain the fifth object described above, the eighth aspect of the present invention provides a recording medium cartridge comprising: a cartridge case for accommodating a recording medium; and a cartridge memory for recording information given when producing the recording medium cartridge.

Preferably, the cartridge memory is attached to such a position as to be exposed when the recording medium cartridge is loaded into a drive or a recording/reproducing device.

Preferably, the cartridge memory is attached to such a position as to be exposed when opening a cover member provided on the recording medium cartridge.

The recording medium cartridge according to the present invention may be exemplified such as a cartridge in which a single reel wound with the magnetic tape is rotatably accommodated on the cartridge case, and a cartridge in which a single magnetic disk is rotatably accommodated in the cartridge case.

Moreover, the recording medium cartridge may be those of which structures and dimensional data are prescribed in the above-mentioned JISX6127 (1992), JISX6129 (1993), JISX6130 (1996) and JISX6141 (1993) and the like.

Preferably, in this case, the cartridge memory is attached to a rear side of the cover member.

Preferably, in each of the recording medium cartridge, a portion peripheral to a fitting position of the cartridge memory is recessed.

Preferably, the information given when producing the recording medium cartridge contains at least a piece of information on a method of forming a magnetic recording layer configuring the recording medium.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which.

DESCRIPTION OF THE PREFERRED EMBODIMENTS

Preferred embodiments of a recording medium cartridge according to the present invention will hereinafter be discussed in depth with reference to the accompanying drawings.

To start with, referring to FIGS. 1 to 4, a magnetic tape cartridge defined as a recording medium cartridge in a first aspect of the present invention, will be explained.

Figure 1:
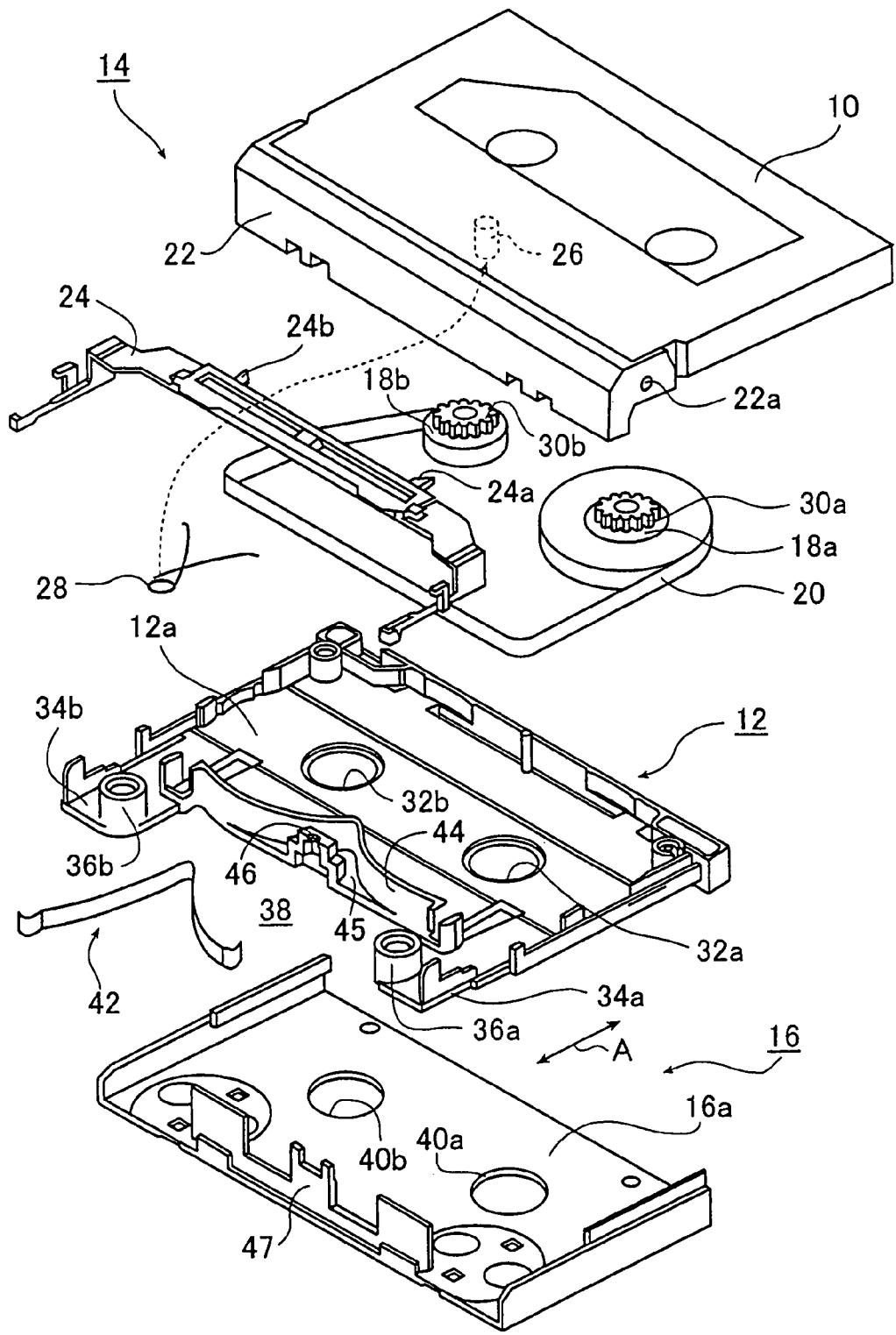
FIG. 1 is a fragmentary perspective view schematically showing a configuration of a 2-reel type magnetic tape cartridge of the present invention.

In advance of the discussion on each embodiment of the recording medium cartridge according to each aspect of the present invention, FIG. 1 schematically shows a fragmentary perspective view of a configuration of the magnetic tape cartridge of the present invention, and a description of an embodiment of a 2 reel type magnetic tape cartridge as the recording medium cartridge to which each aspect of the present invention is applied, will be focused on its configuration, of which a structure and dimensional data are prescribed in JISX6127 (1992).

The magnetic tape cartridge shown in FIG. 1 is mainly constructed of members such as a cartridge body (body case) 14 composed of an upper half 10 and a lower half 12, and a slider 16 so fitted in an outside lower portion of the lower half 12 as to be slidable in arrow directions A in FIG. 1.

This magnetic tape cartridge accommodates, between the upper and lower halves 10 and 12, a magnetic tape 20 extending between and wound on a feeding-side take-up hub 18a and a winding-side take-up hub 18b. Further, a front cover (lid) 22 for covering and protecting the magnetic tape 20 when the magnetic tape cartridge remains unused, is so secured to a front surface of the upper half 10 as to be rotatable at a spindle 22a.

The upper half 10 is provided with a brake member 24 for preventing a slack of the magnetic tape 20 wound on the take-up hubs 18a, 18b when the magnetic tape cartridge is unused. This brake member 24 is biased by a brake spring 28 secured to a protrusion 26 provided on the upper half 10. Brake pieces 24a, 24b of the biased brake member 24 engage with the gears 30a, 30b provided on upper portions of the feeding- and winding-side take-up hubs 18a, 18b, thereby hindering rotations of the take-up hubs 18a, 18b and the slack of the magnetic tape 20.

The lower half 12 is formed with reel shaft insertion holes 32a, 32b through which reel shafts (not shown) for driving the take-up hubs 18a, 18b are inserted into the cartridge body 14 when the magnetic tape cartridge is used. The lower half 12 also has overhangs 34a, 34b extending forwards to the front cover 22 of the upper half 10 from both of right and left side ends of a bottom surface 12a. The right and left overhangs 34a, 34b are provided with cylindrical ribs 36a, 36b for guiding the magnetic tape 20. An air space 38 between the right and left overhangs 34a, 34b may be defined as a spacing into which a so-called tape loading device provided on the side of a recording/reproducing device (deck) loaded with the magnetic tape cartridge.

In this magnetic tape cartridge, the slider 16 slidably fitted in the outside lower portion of the lower half 12 slides on the bottom surface 12a of the lower half 12 in the front and rear directions of the magnetic tape cartridge, i.e., the arrow directions A in FIG. 1. The slider 16 is, when the magnetic tape cartridge is not used, positioned forwards and closes the air space 38 between the right and left overhangs 34a, 34b of the lower half 12, and also the reel shaft insertion holes 32a, 32b. Further, the slider 16 when positioned backwards, uncloses the air space 38 between the right and left overhangs 34a, 34b. At the same time, two pieces of holes 40a, 40b formed in the bottom surface 16a of the slider 16 are aligned with the reel shaft insertion holes 32a, 32b, and openings in which the reel shafts (unillustrated) for driving the take-up hubs 18a, 18b are inserted, are formed.

The slider 16 is, when the magnetic tape cartridge is loaded into the deck, automatically moved backward and located in a predetermined rear position by a function of the tape loading device within the deck. When the magnetic tape cartridge is unused, however, the slider 16 is biased with a forward movement and located in a predetermined front position by a plate spring (biasing device) 42 attached to the lower half 12.

A wall-like member 44 taking a hill-like shape and formed of a series of two pieces of split cylindrical ribs, is erected vertically from the bottom surface 12a on the side (where the magnetic tape 20 is exposed) facing to the air space between the right and left overhangs 34a, 34b provided on the bottom surface 12a of the lower half 12. A bent part of the hill-shaped portion of the wall-like member 44, when the magnetic tape 20 wound on the hubs 18a, 18b is placed thereon, takes a configuration suited to a shape of the tape 20.

Further, a pillar-shaped rib 46 is erected vertically at a substantially central part of an area 45 of the bottom surface 12a, which is sectioned in a triangle by this wall-like member 44. A plate spring 42 for biasing the slider 16 forwards is fitted in between the pillar-shaped rib (slider spring fitting portion) 46 and the wall-like member 44. Moreover, the slider 16 is so biased by the plate spring 42 as to be fixed in a front position when the magnetic tape cartridge is unused.

In the magnetic tape cartridge in a first aspect of the present invention, a non-contact type memory device is provided in a reel of the feeding-side take-up hub 18a or the winding-side take-up hub 18b wound with the magnetic tape.

Figure 2:
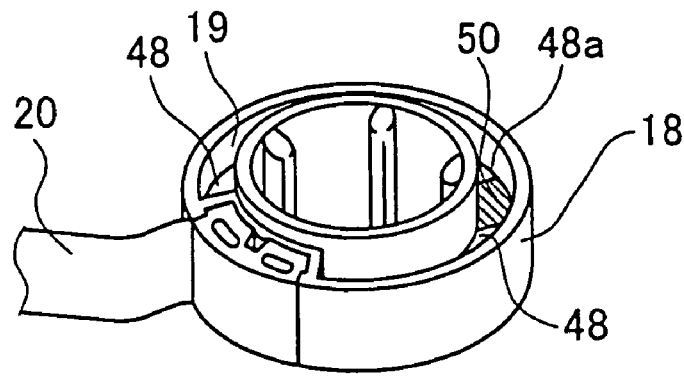
FIG. 2 is a perspective view showing one embodiment of a take-up hub of the magnetic tape cartridge shown in FIG. 1 as viewed from a bottom surface.

A non-contact type memory device 50 used for the present invention may be, for instance, as shown in FIG. 2, provided in a central portion 48a of a lower flange 48 of the feeding- or winding-side take-up hub 18 (18a, 18b), or may be provided along an inner peripheral surface 19 of the feeding- or winding-side take-up hub 18. Furthermore, though not illustrated, the non-contact type memory device 50 may be provided at the central portion of an upper flange of the feeding- or winding-side take-up hub 18.

Any one of positions within the reel of the upper or lower flange, to be more specific, the central portion of the upper or lower flange and the inner peripheral portion of the take-up hub, is properly selected as the position where the non-contact type memory device 50 is provided, corresponding to a position where a data reading/writing unit provided on the side of the recording/reproducing device is disposed. The non-contact type memory device 50 can be provided by effecting its ultrasonic welding to the selected position within the reel of the upper or lower flange, or by holding and fixing it between the upper and lower flanges by other device for fixing the upper and lower flanges.

Figure 3A:
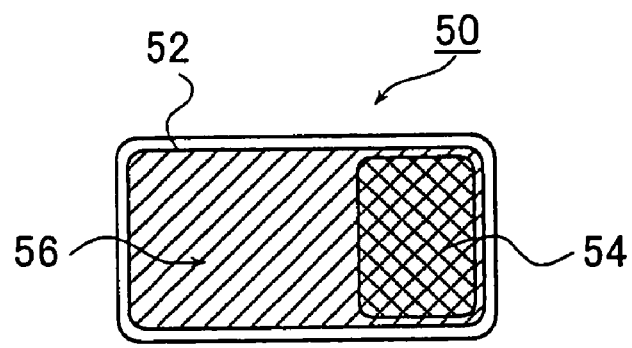
FIGS. 3A and 3B are plan views each showing one embodiment of a non-contact type memory device attached to the magnetic tape cartridge shown in FIG. 1.

The non-contact type memory device 50 (cartridge memory) 50 is, as shown in FIG. 3A, composed of a rectangular plate member, of which an outer periphery is provided with an antenna 52 for transmitting and receiving the data. An IC chip 54 is disposed in an interior of the memory device 50, and the whole of this memory device 50 is sealed by a resin. The antenna 52 is classified as a coil antenna for supplying the IC chip 54 with an induced current electromagnetically induced by a magnetic field emitted from an antenna of the data reading/writing unit to the non-contact type memory device 50 provided on the unillustrated deck side. Note that an area 56 in the non-contact type memory device 50 does not function in particular.

Figure 3B:
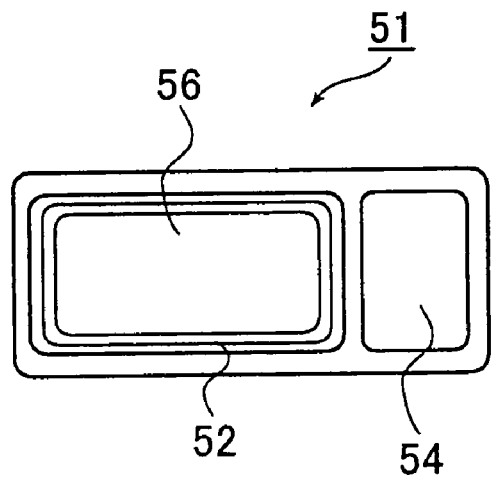

According to the present invention, in addition to the non-contact type memory device 50 shown in FIG. 3A, for example as shown in FIG. 3B, there may be used a non-contact type memory device 51 composed of a substantially rectangular plate member, and including an IC chip 54 disposed at one side end thereof and sealed by the resin, and a data transmitting/receiving antenna 52 disposed along an outer periphery of an area excluding the IC chip 54. Note that there are a variety of types, configurations and dimensions of the non-contact type memory device used for the present invention other than those described above, and another known type is that the IC chip and the data transmitting/receiving antenna are provided separately.

Each of the thus constructed non-contact type memory devices 50, 51 themselves has no power source and is, when inserted into the recording/reproducing device (deck), operated by the induced current electromagnetically induced by the magnetic field emitted from the antenna of the data reading/writing unit to the non-contact type memory device 50 provided there, thereby transmitting and receiving the data between the data reading/writing unit of the recording/reproducing device (deck) and the IC chip 54.

In the magnetic tape cartridge of which the fragmentary perspective view is shown in FIG. 1 and the take-up hub is shown in FIG. 2, the non-contact type memory device is provided within the reel of the upper or lower flange of the tape reel, i.e., within the take-up hub substantially defined as the tape reel, whereby the non-contact type memory device is hard to receive a damage by an external force caused when storing, carrying, loading and ejecting the magnetic tape cartridge. Further, the non-contact type memory device is disposed within the take-up hub and therefore neither becomes an obstacle when loaded and ejected nor comes off inadvertently. Moreover, there is neither a necessity of changing designs of the constructive members of the magnetic tape cartridge nor interference with other members and portions. It is therefore feasible to ensure degrees of freedom of designing the magnetic tape cartridge and designing the data reading/writing unit of the external storage device. Moreover, there are exhibited advantages such as easily fitting it into the take-up hub during the conventional assembly process by the ultrasonic welding and a typical fitting work without requiring a special work, and facilitating the manufacturing process.

Figure 4:
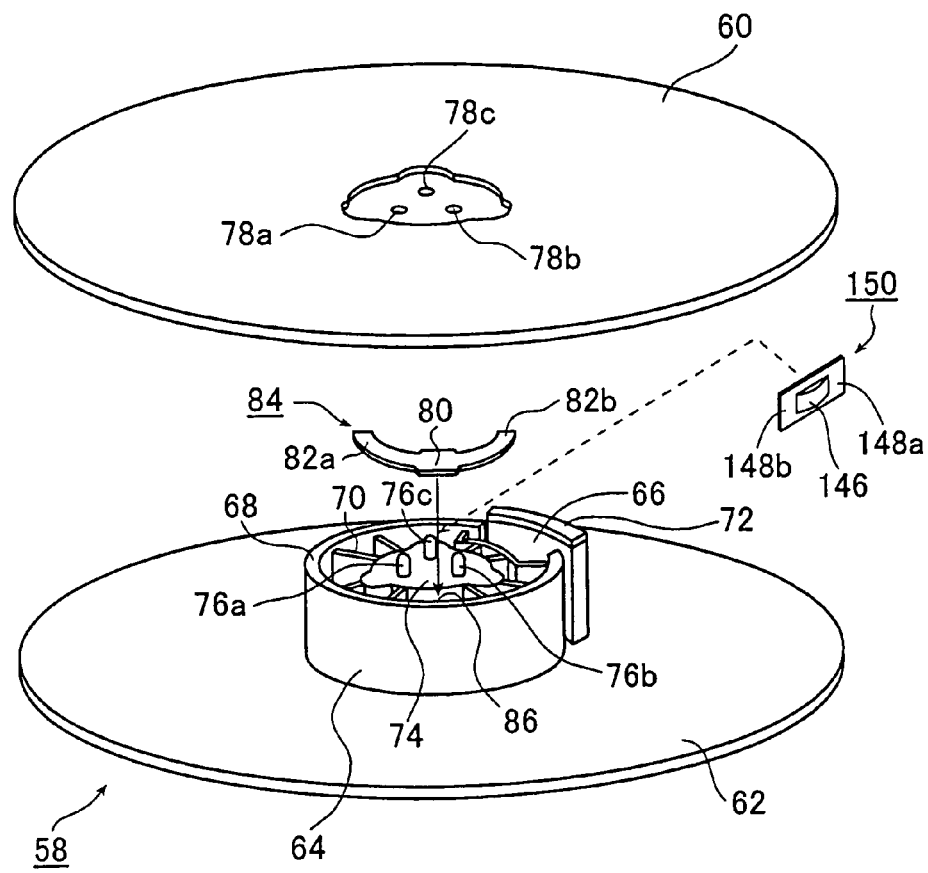
FIG. 4 is a fragmentary perspective view showing another embodiment of the tape reel in the 2-reel type magnetic tape cartridge of the present invention.

FIG. 4 shows an example where the non-contact type memory device is disposed within one tape reel in the 2-reel type magnetic tape cartridge in one embodiment of the magnetic tape cartridge according to the present invention.

A tape reel 58 shown in FIG. 4 has a structure in which a take-up hub 64 is sandwiched in between disk-shaped upper and lower flanges 60, 62. The take-up hub 64 includes a split cylindrical hub body 68 formed partially with a notch 66, and support ribs 70 extending radially from the central axis of the hub body 68. A circular pillar 72 is provided facing to the notch 66 so as to secure a leading edge of the magnetic tape wound on the take-up hub 64, in a position, facing to the notch 66, on the outer periphery of the hub body 68.

The upper flange 60 is attached to the hub body 68 in such a way that protruded pins 76*a*, 76*b*, 76*c* embedded into an upper surface of a fixed member 74 fitted to an upper central portion of the support ribs 70 within the hub body 68 are fitted into holes 78*a*, 78*b*, 78*c* formed, corresponding to the protruded pins 76*a*, 76*b*, 76*c*, in the upper flange 60. Further, the lower flange 62 is likewise attached to the hub body 68.

In this tape reel 58, a non-contact type memory device 84 taking a substantially circular shape, which includes an IC chip 80 provided at the center thereof and antenna segments 82*a*, 82*b* provided at both ends thereof, is attached to the inside of the hub body 68 of the take-up hub 64, as indicated by a solid line arrow. It is also possible with this tape reel 58 that non-contact type memory devices 150 taking a substantially circular shape on the whole and each including an IC chip 146 provided at its central part and antenna segments 148*a*, 148*b* provided at both side ends thereof are attached to an inner peripheral surface 86 of the hub body 68 of the take-up hub 64, as indicated by a broken line arrow. The non-contact type memory device 84 or 150 may be attached to the inner peripheral surface 86 of the hub body 68 by a known method such as the ultrasonic welding.

Note that the substantially circular non-contact type memory devices 84 and 150 shown in FIG. 4 may be of the type illustrated in FIG. 3A or 3B, a type in which the IC chips (80, 146) and the antenna segments (82*a*, 82*b*, and 148*a*, 148*b*) disposed at both side ends are provided separately, and may further be of other types.

In the magnetic tape cartridge including the tape reels shown in FIG. 4, the non-contact type memory device is provided within the reel of the upper or lower flange of the tape reel, i.e., within the hub body 68 of the take-up hub 64 of the tape reel, and is therefore hard to receive a damage by an external force caused when storing, carrying, loading and ejecting the magnetic tape cartridge. Further, the non-contact type memory device is disposed within the hub body and therefore neither becomes an obstacle when loaded and ejected nor comes off inadvertently. Moreover, there is neither a necessity of changing designs of the constructive members of the magnetic tape cartridge nor interference with other members and portions. It is therefore feasible to ensure degrees of freedom of designing the magnetic tape cartridge and designing the data reading/writing unit of the external storage device. Moreover, there are exhibited advantages such as easily fitting the non-contact type memory device into the hub body during the conventional assembly process by the ultrasonic welding and a typical fitting work without requiring a special work, and facilitating the manufacturing process.

Although the tape reel 58 as shown in FIG. 4 is illustrated as an example which is used in a magnetic tape cartridge of 2-reel type, it may also be applied to a magnetic tape cartridge of 1-reel type. In cases with such a 1-reel type magnetic tape cartridge also, the non-contact type memory device 84 or 150 may be attached to the inside of the hub body 68 of the hub 64, that is to say, to the inner peripheral surface 86, for example.

In the 1-reel type magnetic tape cartridge, the non-contact type memory devices are disposed along the inner peripheral surface of the internal hole of the hub, and are therefore hard to receive a damage by an external force caused when storing, carrying, loading and ejecting the magnetic tape cartridge. Further, the non-contact type memory devices are disposed within the hub and therefore neither become an obstacle when loaded and ejected nor come off inadvertently. Moreover, there is neither a necessity of changing designs of the constructive members of the magnetic tape cartridge nor interference with other members and portions. It is therefore feasible to ensure degrees of freedom of designing the magnetic tape cartridge and designing the data reading/writing unit of the external storage device. Moreover, there are exhibited advantages such as easily fitting the non-contact type memory devices into the tape reel during the conventional assembly process by the ultrasonic welding and a typical fitting work without requiring a special work, and facilitating the manufacturing process.

As discussed in depth, according to the magnetic tape cartridge defined the recording medium cartridge in the first aspect of the present invention, the non-contact type memory devices are accommodated in the mis-erasing preventive member without being exposed outside and protected by this mis-erasing preventive member, and are hard to receive a damage by an external force caused when storing, carrying, loading and ejecting the magnetic tape cartridge. The non-contact type memory devices do not become the obstacle when loaded into and ejected from the deck, and do not come off inadvertently.

Furthermore, as compared with the case of attaching the non-contact type memory device to the body interior where the variety of members such as the take-up hub and the magnetic tape in the cartridge body are disposed, it is possible to ensure degrees of freedom of designing the magnetic tape cartridge and designing the data reading/writing unit of the external storage device.

Moreover, according to the magnetic tape cartridge in the first aspect, the arrangement that the non-contact type memory device is disposed at the central portion of the upper or lower flange of the tape reel, can be attained by making a simple change in the assembly work, and hence there is such an advantage in terms of manufacturing that the non-contact type memory device can be extremely easily added and attached to the existing magnetic tape cartridge.

Further, the magnetic tape cartridge in the first aspect does not particularly require the member for fixing and the device for fitting the non-contact type memory device and also the operation of attaching this non-contact type memory device, and can be manufactured by the conventional assembly process.

In addition, according to the magnetic tape cartridge in the first aspect, in the process of manufacturing the magnetic tape cartridge, information on the magnetic tape and on the take-up device can be written then and there to the non-contact type memory device when the magnetic tape is wound on the reel. Hence, the management of a traceability per product within the manufacturing process becomes certain and easy, thereby exhibiting an advantage that the improved management of the traceability is effective in the management of the process and of the quality.

The recording medium cartridge in the first aspect of the present invention is basically constructed in the way described so far.

Next, the magnetic tape cartridge defined as the recording medium cartridge in a second aspect of the present invention, will be explained with reference to FIGS. 1, 3A, 3B and 5.

The magnetic tape cartridge in the second aspect of the present invention will be described in depth by way of a typical example applied to the 2-reel type magnetic tape cartridge of which the configuration is schematically shown in the fragmentary perspective view of FIG. 1.

Figure 5:
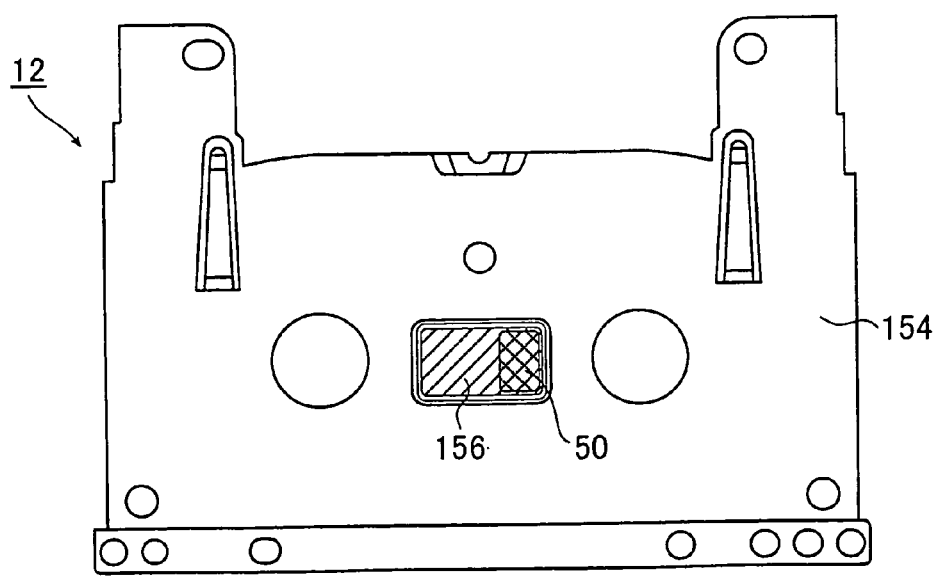
FIG. 5 is a view showing the bottom surface of the lower half of the magnetic tape cartridge shown in FIG. 1 by way of one embodiment thereof.

In the magnetic tape cartridge in the second aspect of the present invention, as shown in FIG. 5 as a view of a bottom surface of the lower half thereof, a non-contact type memory device 50 is provided on a surface facing to the tape winding surface, i.e., on a lower bottom surface 154 of the lower half 12. The non-contact type memory device 50 is disposed in a recessed portion 156 formed in the lower bottom surface 154 of the lower half 12. The recessed portion 156 is not limited to the forming position shown in FIG. 5 and may be formed in any position on the lower bottom surface 154 of the lower half 12 in a way that does not interfere with the respective members on the lower bottom surface 154, as far as the data reading/writing unit provided in the storage device loaded with the magnetic tape cartridge is capable of reading and writing the data.

Further, the position where the non-contact memory device is disposed is not limited to the embodiment shown in FIG. 5, and may be provided on the surface facing to the tape winding surface, i.e. on an upper surface, outside the upper half, of the cartridge body and so on. The non-contact type memory device can be fixed by methods such as welding, pasting by use of an adhesive agent, performing insert-molding of the cartridge body in a state where the non-contact type memory device is provided in a predetermined position of a molding die, and fixedly holding a substrate itself of the non-contact type memory device in a predetermined position of the cartridge body.

There is no particular limit to the non-contact type memory device used in the second aspect. In addition to the non-contact type memory device 50 shown in FIG. 3A and the non-contact type memory device 51 shown in FIG. 3B as well, various types of non-contact type memory devices with variations in configuration and dimension such as the non-contact type memory devices 84, 150 shown in FIG. 4, may be exemplified.

As discussed so far in details, according to the magnetic tape cartridge defined as the recording medium cartridge in the second aspect of the present invention, the non-contact type memory device is accommodated in and protected by the mis-erasing preventive member without being exposed to the outside. The non-contact type memory device is therefore hard to receive a damage by an external force caused when storing, carrying, loading and ejecting the magnetic tape cartridge, and does not become the obstacle when loaded and ejected.

Moreover, as compared with the case of attaching the non-contact type memory device to the body interior where the variety of members such as the take-up hub and the magnetic tape in the cartridge body are disposed, it is possible to ensure degrees of freedom of designing the magnetic tape cartridge and designing the data reading/writing unit of the external storage device.

Further, according to the magnetic tape cartridge in the second aspect, the arrangement that the non-contact type memory device is disposed at the central portion of the upper or lower flange of the tape reel, can be attained by making a simple change in the assembly work, and hence there is such an advantage in terms of manufacturing that the non-contact type memory device can be extremely easily added and attached to the existing magnetic tape cartridge.

Furthermore, the magnetic tape cartridge in the second aspect, the tape winding surface has a magnetism shielding property, and hence an advantage is that the non-contact type memory device is hard to receive an influence of the magnetic field produced by devices other than the data reading/writing unit, which is effective in protecting the data.

The recording medium cartridge in the second aspect of the present invention is basically constructed in the way described so far.

Next, the magnetic tape cartridge defined as the recording medium cartridge in a third aspect of the present invention, will be explained with reference to FIGS. 1, 3A, 3B, 6 and 7.

The magnetic tape cartridge in the third aspect of the present invention will be described in depth by way of a typical example applied to the 2-reel type magnetic tape cartridge of which the configuration is schematically shown in the fragmentary perspective view of FIG. 1.

Figure 6:
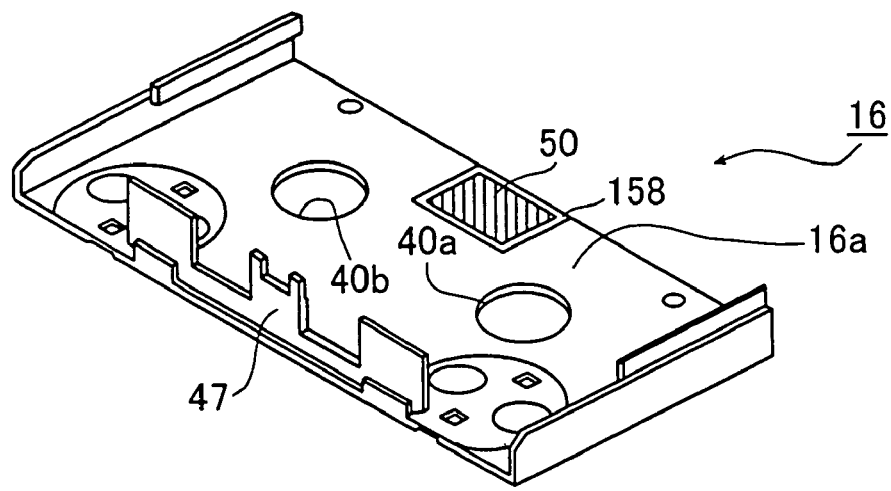
FIG. 6 is a perspective view showing one embodiment of a slider of the magnetic tape cartridge shown in FIG. 1.
Figure 7:
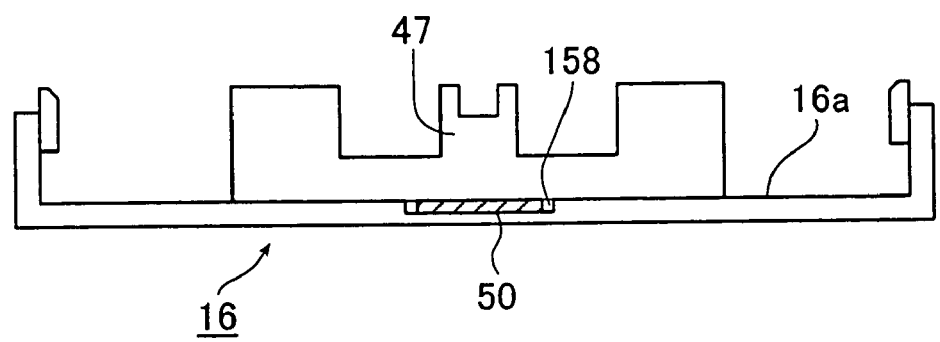
FIG. 7 is a view showing a rear surface of the slider shown in FIG. 6.

In the magnetic tape cartridge in the third aspect of the present invention, as shown in FIGS. 6 and 7, the non-contact type memory device 50 is provided in a recessed portion 158 formed in an upper surface 16a of the slider 16 that slides on a bottom surface 12a of the lower half.

In the magnetic tape cartridge of the present invention, the recessed portion accommodating the non-contact type memory device is not confined to the embodiment shown in FIG. 1, and may be formed in any position on the upper surface of the slider and on the bottom surface of the lower half in a way that does not hinder the basic function required of the slider, and its form may be properly determined corresponding to the non-contact type memory device and is not particularly limited.

Further, a depth of the recessed portion formed in the bottom surface of the lower half or in the upper surface of the slider, is set equal to larger than at least a thickness of the non-contact type memory device and also, it is desirable, be set so that the non-contact type memory device does not become a hindrance against the slider's moving forwards of the cartridge case. In this case, the depth of the recessed portion is set the same as the thickness of the non-contact type memory device, and the upper surface of the non-contact type memory device is set flush with or under the upper surface of the slider. With this contrivance, a slide resistance caused by a friction between the upper surface of the non-contact type memory device and the bottom surface of the lower half is reduced. This is effective in enhancing the slidability of the slider.

Moreover, the non-contact type memory device might protrude from the recessed portion formed in the upper surface of the slider or in the bottom surface of the lower half, depending on a state of how this non-contact type memory device is fitted therein, with the result that an internal gap extending in a thicknesswise direction of the upper surface of the slider or the bottom surface of the lower half might be pressed. Therefore, if the recessed portion is formed on the side facing to the surface fitted with the non-contact type memory device so as not to become the hindrance against the sliding of the slider, this contrivance is effective in preventing the unsmoothed slide and an occurrence of abnormal state when the slider slides thereon.

Note that other various types of non-contact type memory devices from the non-contact type memory device 50 down shown in FIG. 3A and the non-contact type memory device 51 shown in FIG. 3B may be, as in the case of the second aspect, used also in the third aspect.

As discussed above in details, according to the magnetic tape cartridge defined as the recording medium cartridge in the third aspect of the present invention, the non-contact type memory device is attached to the bottom surface of the lower half configuring the cartridge case or to the upper surface of the slider, whereby the non-contact type memory device can be fitted thereto in a state of a single component of the lower half or the slider within the assembly process of the cartridge case, and the non-contact type memory device can be inspected in the state of its being attached to this single component. Therefore, even if some defect is detected, the defect can be detected on the unit of the single component without deassembling the cartridge. Moreover, the non-contact type memory device can be attached in the final process of the cartridge assembly, and it is not required that the non-contact type memory device is inspected before being assembled, thereby making it possible to reduce the number of assembly steps.

Further, the non-contact type memory device provided in the recessed portion formed in the upper surface of the slider is protected by the slider without being exposed to the outside. Hence, the non-contact type memory device is hard to receive a damage by an external force caused when storing, carrying, loading and ejecting the magnetic tape cartridge, and does not become the obstacle when loaded and ejected.

Furthermore, as compared with the case of attaching the non-contact type memory device to the body interior, it is possible to ensure degrees of freedom of designing the magnetic tape cartridge and designing the data reading/writing unit of the external storage device.

Moreover, according to the magnetic tape cartridge in the third aspect, the arrangement that the recessed portion is formed in the bottom surface of the lower half or in the upper surface of the slider, can be attained by making a simple change in the molding die of the lower half or the slider, and hence there is such an advantage in terms of manufacturing that the non-contact type memory device can be extremely easily added and attached to the existing magnetic tape cartridge.

The recording medium cartridge in the third aspect of the present invention is basically constructed in the way described so far.

Next, the magnetic tape cartridge defined as the recording medium cartridge in a fourth aspect of the present invention, will be described with reference to FIGS. 1, 3A, 3B, 8 and 9.

The magnetic tape cartridge in the fourth aspect of the present invention will be described in depth by way of a typical example applied to the 2-reel type magnetic tape cartridge of which the configuration is schematically shown in the fragmentary perspective view of FIG. 1, and the structure and dimensional data are prescribed in JISX6127 (1992).

Figure 8:
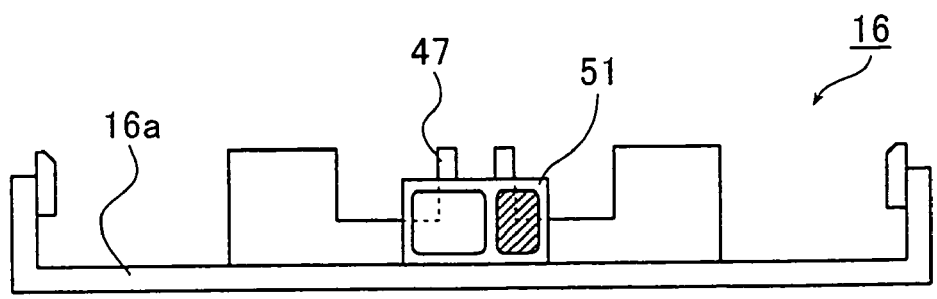
FIG. 8 is a side view of another embodiment of the slider of the magnetic tape cartridge shown in FIG. 1, showing an example of how the non-contact type memory device is attached to the magnetic tape cartridge.

FIG. 8 is a view taken along the line with the arrow head A in (FIG. 1) related to one embodiment of the present invention, showing how the above-described non-contact type memory device (which will hereinafter be called a cartridge memory) 51 is attached to the slider 16 of the magnetic tape cartridge described above. Herein, the cartridge memory 51 is attached to an inner surface of a recording medium turn preventive rib 47 within the slider 16 of the magnetic tape cartridge. Note that the cartridge memory 51 is attached by using the adhesive agent.

When the cartridge memory 51 is attached to the inner surface of the recording medium turn preventive rib 47 within the slider 16 of the magnetic tape cartridge, it is desirable that a portion peripheral to an attaching position of the cartridge memory 51 be recessed as much as possible. This is because an unnecessary contact should be avoided during the running of the magnetic tape 20 in the magnetic tape cartridge.

In the thus constructed magnetic tape cartridge, the cartridge memory 51 used herein has a size suited to a size of the recording medium turn preventive rib within the slider 16 given above, and is attached to the inner surface of the recording medium turn preventive rib 47 within the slider 16, whereby the cartridge memory 51 can be fitted without hindering a running stability of the magnetic tape 20.

Then, when the magnetic tape cartridge is set in the recording/reproducing device, the data can be transmitted and received without any trouble between this cartridge memory 51 and the data reading/writing unit provided in the recording/reproducing device.

Contents recorded on the cartridge memory 51 may be exemplified by items of information (such as a name of program, a name of picture, a location and a name of music) recorded on the recording medium cartridge by the user of this recording medium cartridge.

Further, the recording/reproducing device may record, on the chip 54 within the cartridge memory 51, pieces of information on various conditions given when producing (manufacturing) the magnetic tape cartridge. These pieces of information are read from the cartridge memory 51 for a variety of analyses as the necessity may arise.

Figure 9:
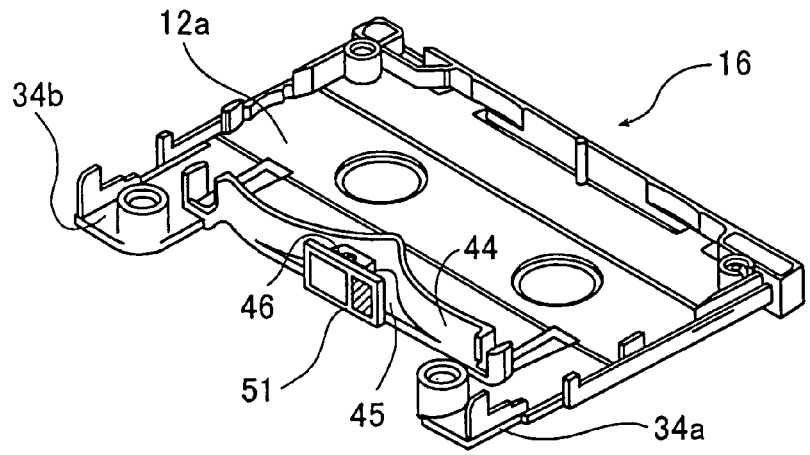
FIG. 9 is a side view of another embodiment of the lower half of the magnetic tape cartridge shown in FIG. 1, showing another example of how the non-contact type memory device is attached to the magnetic tape cartridge.

FIG. 9 is related to a modified example of the embodiment given above, and shows how the cartridge memory 51 is attached to the magnetic tape cartridge described above. A point different from the embodiment illustrated in FIG. 8 is that the cartridge memory 51 is herein attached to a front surface of a slider spring securing member 46 in the lower half 12. The cartridge memory 51 is attached, as in the preceding embodiment, by use of the adhesive agent.

It is herein also desirable that a portion peripheral to an attaching position of the cartridge memory 51 be recessed as much as possible. The reason is the same as the above, i.e., it is because the unnecessary contact should be avoided during the running of the magnetic tape 20 in the magnetic tape cartridge.

Note that the cartridge memory 51 is attached to the front surface of the slider spring securing member within the lower half 12 in the magnetic tape cartridge in the second embodiment according to the fourth aspect, and hence, if the slider spring is composed of a metal, it can be expected that a transmitting/receiving sensitivity with respect to the cartridge memory 51 is enhanced owing to an antenna effect of this slider spring.

In the thus constructed magnetic tape cartridge in the second embodiment also, the cartridge memory 51 can be attached without hindering the running stability of the magnetic tape 20. Further, when the magnetic tape cartridge is set in the recording/reproducing device, the data can be transmitted and received with no trouble between this cartridge memory 51 and the data reading/writing unit provided in the deck.

Note that the embodiment given above is one example of the present invention, and the present invention should not, as a matter of course, be limited to this embodiment. For instance, the cartridge memory 51 may be attached to the magnetic tape cartridge by utilizing methods using an adhesive double-coated tape, screws and the like other than the method using the adhesive agent.

Furthermore, the cartridge memory attached to the recording medium cartridge may be stored with information (protect information) indicating whether or not an access to the information recorded on the recording medium accommodated in the recording medium cartridge should be permitted. Still further, an IC chip used only for the protect information, which is different from the IC chip in the cartridge memory described above, may be provided, and the protect information may be read from and written to this IC chip for the protect information.

Note that the cartridge memory may be disposed in front of the slider spring securing member in the lower half 12. If adopting this configuration, an advantage is that the antenna function of the slider spring can be expected.

Further, the cartridge memory used in the fourth aspect is not particularly restrictive as in the respective aspects, and various types of cartridge memories such as the cartridge memory 51 shown in FIG. 3B, the cartridge memory 50 shown in FIG. 3A and other types of the cartridge memories may be used.

As discussed above in details, according to the fourth aspect of the present invention, the cartridge memory is attached within the slider of the recording medium cartridge, thereby yielding large effects in which the cartridge memory can be fitted without forming a new fitting area, and the recording medium cartridge capable of restraining a decline of the running stability of the magnetic tape in the recording medium cartridge, can be provided.

More specifically, according to the fourth aspect, the cartridge memory is attached to the inner surface of the recording medium turn preventive rib in the slider of the magnetic tape cartridge. This area is, however, an area having a comparatively large space as for the interior of the magnetic tape cartridge as well as being an area with a less influence upon other portions.

The recording medium cartridge in the fourth aspect of the present invention is basically constructed in the way described so far.

Next, the magnetic tape cartridge defined as the recording medium cartridge in a fifth aspect of the present invention, will be described with reference to FIGS. 1, 3A, 3B, 10 and 11.

The magnetic tape cartridge in the fifth aspect of the present invention will be described in depth by way of a typical example applied to the 2-reel type magnetic tape cartridge of which the configuration is schematically shown in the fragmentary perspective view of FIG. 1, and the structure and dimensional data are prescribed in JISX6127 (1992).

Figure 10:
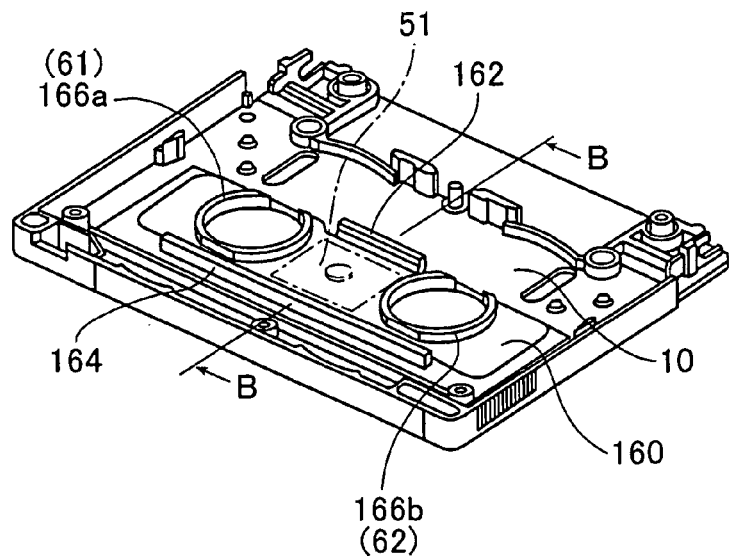
FIG. 10 is a perspective view of one embodiment of the upper half of the magnetic tape cartridge shown in FIG. 1, showing still another example of how the non-contact type memory device is attached to the magnetic tape cartridge.

FIG. 10 is related to one embodiment of a fifth aspect of the present invention and shows how the cartridge memory 51 is attached to the magnetic tape cartridge illustrated in FIG. 1. Herein, the cartridge memory 51 formed on a transparent support member like an acrylonitrile substrate is fitted within a space, above the magnetic tape 20 wound on the hubs 18a, 18b, of the lower surface (underside) of a transparent window 160 of the upper half 10 of the magnetic tape cartridge.

More specifically, the cartridge memory 51 is herein attached in a way of being inserted through notches 162a, 164a formed in sheet positioning ribs 162, 164 erected from the lower surface of the transparent window 160 of the upper half 10 of the magnetic tape cartridge. On this occasion, the cartridge memory 51 may be fixed to the notches 162a, 164a of the sheet positioning ribs 162, 164 by using the adhesive agent as the necessity may arise.

Note that the cartridge memory 51 is fitted in a space between hub floating preventive ribs 166a, 166b formed on the upper half 10 as well as being inserted into the notches 162a, 164a of the sheet positioning ribs 162, 164. As described above, however, this space is a dead space so far, and the cartridge memory 51 can be attached within the magnetic tape cartridge by utilizing this space without preparing a new space.

Figure 11:
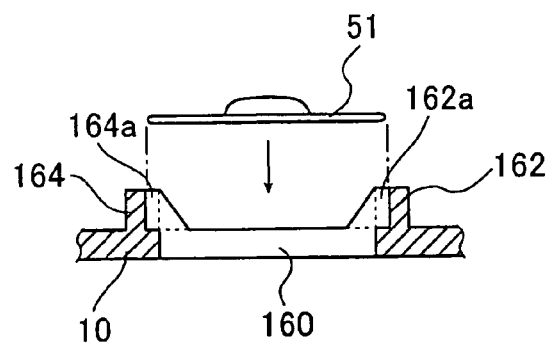
FIG. 11 is a sectional view taken along the line B—B of the upper half of the magnetic tape cartridge shown in FIG. 10.
Figure 12:
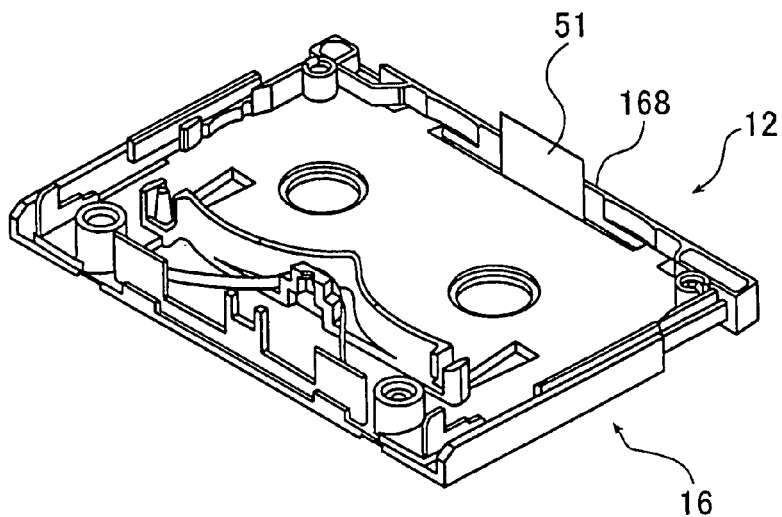
FIG. 12 is a perspective view of one embodiment of an assembly of the lower half and the slider of the magnetic tape cartridge shown in FIG. 1, showing an example of how the non-contact type memory device is attached to the lower half of the magnetic tape cartridge.

Further, when the cartridge memory 51 is fitted to the lower surface of the transparent window 160 of the upper half 10 of the magnetic tape cartridge, it is desirable that a portion peripheral to a position, for attaching the cartridge memory 51, on the lower surface of the transparent window 160 of the upper half 10 be recessed as much as possible as shown in FIG. 11. This is because an unnecessary contact should be avoided during the running of the magnetic tape 20 in the magnetic tape cartridge.

In the thus constructed magnetic tape cartridge, the cartridge memory 51 is attached to the lower surface of the transparent window 160 of the upper half 10. This contrivance makes it possible to fit the cartridge memory 51 without hindering a visual recognizability (such as confirming a tape residual quantity and a winding state) of the magnetic tape 20 in the transparent window 160 of the upper half 10 and also the running stability of the magnetic tape 20.

Then, when the magnetic tape cartridge is set in the recording/reproducing device, the data can be transmitted and received without any trouble between this cartridge memory 51 and the data reading/writing unit provided in the recording/reproducing device.

Contents recorded on the cartridge memory 51 may be exemplified by items of information (such as a name of program, a name of picture, a location and a name of music)

recorded on the recording medium cartridge by the user of this recording medium cartridge.

Further, the recording/reproducing device may record, on the chip 54 within the cartridge memory 51, pieces of information on various conditions given when producing (manufacturing) the magnetic tape cartridge. These pieces of information are read afterward from the cartridge memory 51 for a variety of analyses as the necessity may arise.

Another embodiment given herein is that the cartridge memory 51 is attached to the transparent window 160 of the magnetic tape cartridge by use of an adhesive double-coated tape involving the use of a transparent support member or by use of an adhesive agent that will become transparent after being dried.

Herein also, when the cartridge memory 51 is fitted to the lower surface of the transparent window 160 of the upper half 10, it is desirable that a portion peripheral to a position, for attaching the cartridge memory 51, on the lower surface of the transparent window 160 be recessed as much as possible. The reason is the same as the above, and it is because an unnecessary contact should be avoided during the running of the magnetic tape 20 in the magnetic tape cartridge.

In the thus constructed magnetic tape cartridge, the cartridge memory 51 can be attached without hindering the visual recognizability of the magnetic tape 20 in the transparent window 160 and also the running stability of the magnetic tape 20.

Further, when the magnetic tape cartridge is set in the recording/reproducing device, the data can be transmitted and received without any trouble between this cartridge memory 51 and the data reading/writing unit provided in the recording/reproducing device.

Each of the embodiments given above is one example of the present invention, and the present invention should not, as a matter of course, be limited to these embodiments. For example, the cartridge memory 51 may be attached to the magnetic tape cartridge by utilizing methods involving the use of screws and a dedicated engaging tool other than the method of inserting it through the notches of the sheet positioning ribs, the method using the adhesive double-coated tape and the method using the adhesive agent.

Moreover, when the upper half 10 of the magnetic tape cartridge is molded integrally including the transparent window 160, if molded inclusive of the cartridge memory 51 formed on the transparent substrate, the cartridge memory 51 can be attached more surely to (the transparent window 160 of the upper half 10 of) the magnetic tape cartridge.

Furthermore, the cartridge memory attached to the recording medium cartridge may be stored with information (protect information) indicating whether or not an access to the information recorded on the recording medium accommodated in the recording medium cartridge should be permitted. Still further, an IC chip used only for the protection information, which is different from the IC chip in the cartridge memory described above, may be provided, and the protect information may be read from and written to this IC chip for the protect information.

Further, the cartridge memory used in the fifth aspect is not particularly restrictive as in the respective aspects, and various types of cartridge memories such as the cartridge memory 51 shown in FIG. 3B, the cartridge memory 50 shown in FIG. 3A and other types of the cartridge memories may be used.

As discussed above in depth, according to the fifth aspect of the present invention, the cartridge memory is attached to the lower surface (underside) of the transparent window provided inwardly of the recording medium cartridge, thereby obtaining large effects in which the cartridge memory can be fitted without forming a new fitting area, and the recording medium cartridge capable of restraining a decline of the running stability of the magnetic tape in the recording medium cartridge, can be provided.

More specifically, the cartridge memory itself is formed on the transparent support member and attached to the transparent window of the recording medium cartridge. With this contrivance, the cartridge memory can be fitted in safety by use of the space, treated as the dead space so far, above the magnetic tape without any substantial change in the mode.

The recording medium cartridge in the fifth aspect of the present invention is basically constructed in the way described above.

Next, the magnetic tape cartridge defined as the recording medium cartridge in a sixth aspect of the present invention, will be described with reference to FIGS. 1, 3A, 3B, 12, 13 and 14.

The magnetic tape cartridge in the sixth aspect of the present invention will be described in depth by way of a typical example applied to the 2-reel type magnetic tape cartridge of which the configuration is schematically shown in the fragmentary perspective view of FIG. 1, and the structure and dimensional data are prescribed in JISX6127 (1992).

Figure 13:
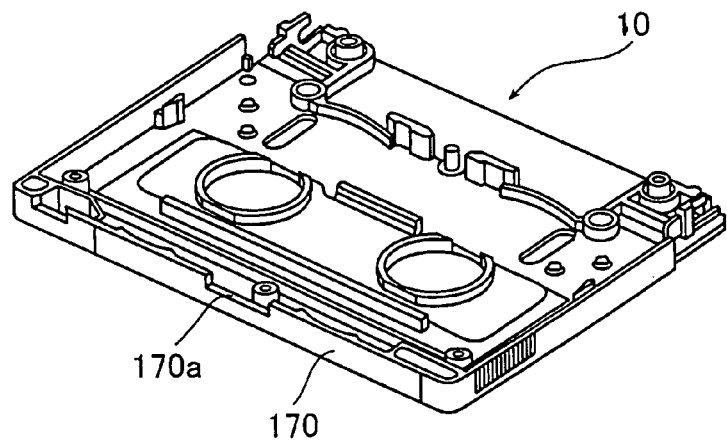
FIG. 13 is a perspective view showing one example of a configuration of the upper half corresponding to the lower half shown in FIG. 12.

FIG. 13 is related to one embodiment of the present invention, and shows how the cartridge memory 51 is attached to the magnetic tape cartridge described above. The cartridge memory 51 is herein attached to an internal surface of a side wall of the rear surface of the lower half 12 of the magnetic tape cartridge. Note that the cartridge memory 51 is fitted thereto by the adhesive agent.

Note that when the cartridge memory 51 is attached to the internal surface of the side wall 168 of the rear surface of the lower half 12, it is desirable that a portion peripheral to a position for attaching the cartridge memory 51 be recessed as much as possible. This is because an unnecessary contact should be avoided during the running of the magnetic tape 20 in the magnetic tape cartridge by ensuring a capacity of the space in the magnetic tape cartridge.

In the thus constructed magnetic tape cartridge in this embodiment, it is desirable that an upper side (i.e., the side of the upper half 10) of the side wall 168 on the rear surface side of the lower half 12 be notched (168a) with substantially the same size as a size of a data transmitting/receiving antenna (antenna coil) 52 of the cartridge memory 51 as in the case of the lower side of the upper half 10 which will be mentioned later on.

This configuration lessens a communication barrier between the IC chip 54 of the cartridge memory 51 and the data reading/writing unit provided in the recording/reproducing device loaded with the magnetic tape cartridge through the data transmitting/receiving antenna (antenna coil) 52, thereby obtaining such an effect that the data can be transmitted and received with a high sensitivity.

FIG. 13 shows the upper half 10 including a notch 170a formed in the side wall 170 on the rear surface side, which is the same as the notch 168a of the side wall 168 on the rear surface side of the lower half 12 described above, wherein a recess taking substantially the same shape as that of the cartridge memory 51 is formed inside the side wall 170 in the position in which to attach the cartridge memory 51.

Note that each of the notches 168a, 170a may set to a size including the IC chip 54 as well as the data transmitting/receiving antenna 52 of the cartridge memory 51.

Figure 14:
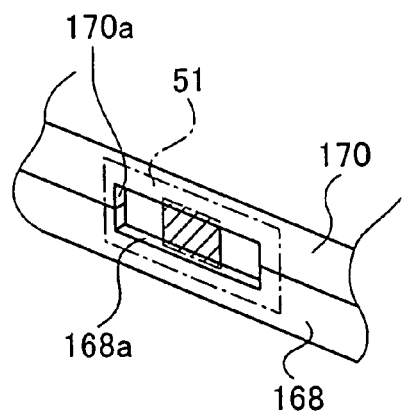
FIG. 14 is a perspective view of principal portions, showing how the upper and lower halves are assembled in another embodiment of the magnetic tape cartridge shown in FIG. 1.

FIG. 14 is a perspective view showing how the cartridge memory 51 in other embodiment is attached in a state where the upper half 10 and the lower half 12 are assembled. As obvious from FIG. 14, the size of the notch described above is set to such a degree that both of the IC chip 54 of the cartridge memory 51 and the data transmitting/receiving antenna 52 are partially exposed therefrom in this embodiment. A size of an opening in this case may be set to such an extent as to obtain, for instance, a definite enhancement of the communication sensitivity with the data reading/writing unit provided in the actual recording/reproducing device.

Note that in the thus constructed magnetic tape cartridge in each embodiment discussed above, the cartridge memory 51 used herein has a size suited to a size of the space on the rear surface side of the magnetic tape cartridge, and is attached between the upper half 10 and the lower half 12, whereby the cartridge memory 51 can be attached without hindering the running stability of the magnetic tape 20.

On the occasion of setting the magnetic tape cartridge in the recording/reproducing device, the data can be transmitted and received without any trouble between this cartridge memory 51 and the data reading/writing unit provided in the recording/reproducing device.

Contents recorded on the cartridge memory 51 may be exemplified by items of information (such as a name of program, a name of picture, a location and a name of music) recorded on the recording medium cartridge by the user of this recording medium cartridge.

Further, the recording/reproducing device may record, on the chip 54 within the cartridge memory 51, pieces of information on various conditions given when producing (manufacturing) the magnetic tape cartridge. These pieces of information are read afterward from the cartridge memory 51 for a variety of analyses as the necessity may arise.

Each of the embodiments given above is one example of the present invention, and the present invention should not, as a matter of course, be limited to these embodiments. For example, the cartridge memory 51 may be attached to the magnetic tape cartridge by utilizing methods involving the use of an adhesive double-coated tape and screws other than the method using the adhesive agent.

Further, each of the embodiments discussed above has given the example wherein the cartridge memory 51 is attached to the internal surface of the side wall on the rear surface side of the magnetic tape cartridge. The fitting position of the cartridge memory 51 is not, however, limited to this, and there is no restriction in attaching the cartridge memory 51 in other positions or other surfaces (internal surfaces). It is, however, preferable that the fitting position be suitable for forming the above-mentioned notch in at least one of the upper and lower halves.

Moreover, the cartridge memory attached to the recording medium cartridge may be stored with information (protect information) indicating whether or not an access to the information recorded on the recording medium accommodated in the recording medium cartridge should be permitted. Still further, an IC chip used only for the protection information, which is different from the IC chip in the cartridge memory described above, may be provided, and the protect information may be read from and written to this IC chip for the protect information.

Further, the cartridge memory used in the sixth aspect is not particularly restrictive as in the respective aspects, and various types of cartridge memories such as the cartridge memory 51 shown in FIG. 3B, the cartridge memory 50 shown in FIG. 3A and other types of the cartridge memories may be used.

As discussed above in details, according to the sixth aspect of the present invention, the cartridge memory is attached within the space, on the rear surface side, between the upper and lower halves of the recording medium cartridge, thereby obtaining large effects in which the cartridge memory can be fitted without forming a new fitting area, and the recording medium cartridge capable of restraining a decline of the running stability of the magnetic tape in the recording medium cartridge, can be provided.

The recording medium cartridge in the sixth aspect of the present invention is basically constructed in the way described above.

Next, the magnetic tape cartridge defined as the recording medium cartridge in a seventh aspect of the present invention, will be described with reference to FIGS. 1, 3A, 3B, 15 and 16.

The magnetic tape cartridge in the seventh aspect of the present invention will be described in depth by way of a typical example applied to the 2-reel type magnetic tape cartridge of which the configuration is schematically shown in the fragmentary perspective view of FIG. 1, and the structure and dimensional data are prescribed in JISX6127 (1992).

Figure 15:
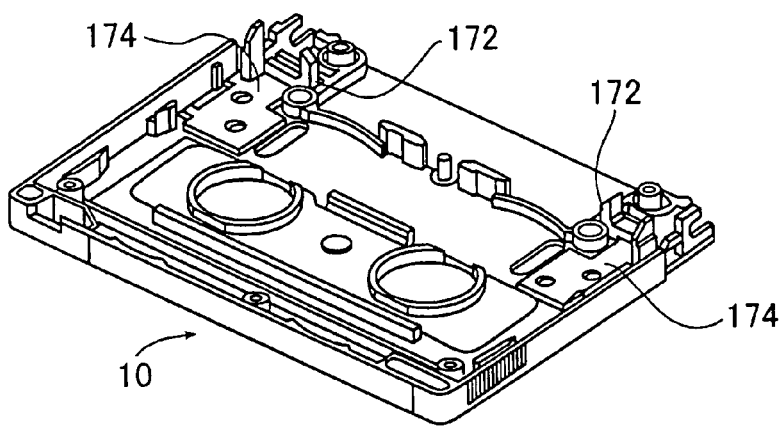
FIG. 15 is a perspective view of another embodiment of the upper half, showing how a detecting device using a prism is attached in the magnetic tape cartridge shown in FIG. 1.

FIG. 15 is a view showing how a member including a prism configuring, though not illustrated in the magnetic tape cartridge shown in FIG. 1, an optical detecting device in the upper half 10 of which the reverse side is herein illustrated.

In the magnetic tape cartridge shown in FIG. 15, a prism support member 174 for supporting the prism 172 is fixed (welded) through its base member (fitting member) to a predetermined position on the upper half 10.

Figure 16:
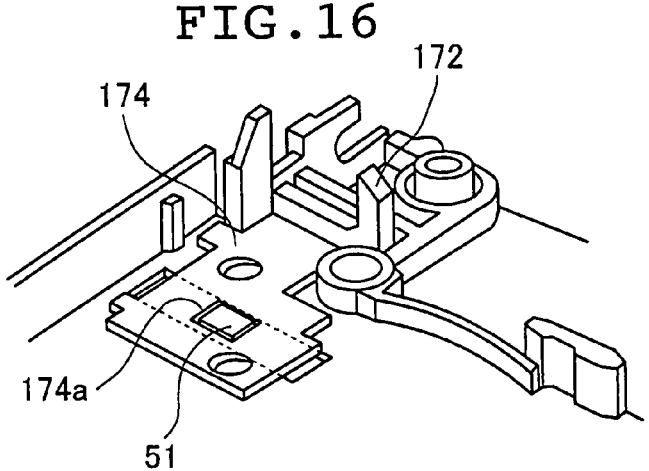
FIG. 16 is a perspective view of the principal portions of the upper half shown in FIG. 15, showing an example of attaching the non-contact memory device to the magnetic tape cartridge.

FIG. 16 is related to one embodiment of the present invention and a perspective view of the principal portion, showing how the cartridge memory 51 is attached to the magnetic tape cartridge. Herein, the cartridge memory 51 is fitted into a recess 42a formed in the upper half 10 of the magnetic tape cartridge in such a manner that the prism support member 174 presses the cartridge memory 51 against the rear surface of the upper half 10.

This fitting of the cartridge memory 51 involves steps of setting the cartridge memory 51 into the recess 42a in the upper half 10, further setting the prism support member 174 on the cartridge memory 51, and, after aligning these components in the predetermined position, effecting thermal welding such as high-frequency welding between the base member of the prism support member 174 and the bottom surface of the upper half 10.

Note that it is preferable a notch (indicated by 174a in FIG. 16) slightly larger than at least a size of the IC chip 54 of the cartridge memory 51, for preventing a damage to the cartridge memory 51, be formed in the base member of the prism support member 174 and an area other than the IC chip 54 of the cartridge memory 51 be retained by the base member of the prism support member 174.

In the thus constructed magnetic tape cartridge in this embodiment, the cartridge memory 51 used herein has the size suitable for its being accommodated within the fitting area described above, and is attached to the rear surface of the upper half 10 with the aid of the prism support member 174, whereby the cartridge memory 51 can be attached thereto without hindering the running stability of the magnetic tape 20.

Contents recorded on the cartridge memory 51 may be exemplified by items of information (such as a name of program, a name of picture, a location and a name of music) recorded on the recording medium cartridge by the user of this recording medium cartridge.

Further, in the production process, the dedicated recording/reproducing device may record, on the chip 54 within the cartridge memory 51, pieces of information on various conditions given when producing (manufacturing) the magnetic tape cartridge. These pieces of information are read afterward from the cartridge memory 51 for a variety of analyses as the necessity may arise.

In the thus constructed magnetic tape cartridge in this embodiment also, the cartridge memory 51 can be attached thereto without hindering the running stability of the magnetic tape 20. Further, on the occasion of setting the magnetic tape cartridge in the recording/reproducing device, the data can be transmitted and received without any trouble between this cartridge memory 51 and the data reading/writing unit provided in the recording/reproducing device.

Each of the embodiments given above is one example of the present invention, and the present invention should not, as a matter of course, be limited to these embodiments. For example, a type (structure) of the cartridge memory 51 attached to the magnetic tape cartridge is not particularly limited.

Moreover, the cartridge memory attached to the recording medium cartridge may be stored with information (protect information) indicating whether or not an access to the information recorded on the recording medium accommodated in the recording medium cartridge should be permitted. Still further, an IC chip used only for the protection information, which is different from the IC chip in the cartridge memory described above, may be provided, and the protect information may be read from and written to this IC chip for the protect information.

Further, the cartridge memory used in the seventh aspect is not particularly restrictive as in the respective aspects, and various types of cartridge memories such as the cartridge memory 51 shown in FIG. 3B, the cartridge memory 50 shown in FIG. 3A and other types of the cartridge memories may be used.

As discussed above in details, according to the seventh aspect of the present invention, the cartridge memory is attached within the upper half by use of the prism support member of the recording medium cartridge, thereby obtaining large effects in which the cartridge memory can be fitted without forming a new fitting area, and the recording medium cartridge capable of restraining a decline of the running stability of the magnetic tape in the recording medium cartridge, can be provided.

The recording medium cartridge in the seventh aspect of the present invention is basically constructed in the way described above.

Next, the magnetic tape cartridge defined as the recording medium cartridge in an eighth aspect of the present invention, will be described with reference to FIGS. 1, 3A, 3B and 17 through 21.

Figure 17:
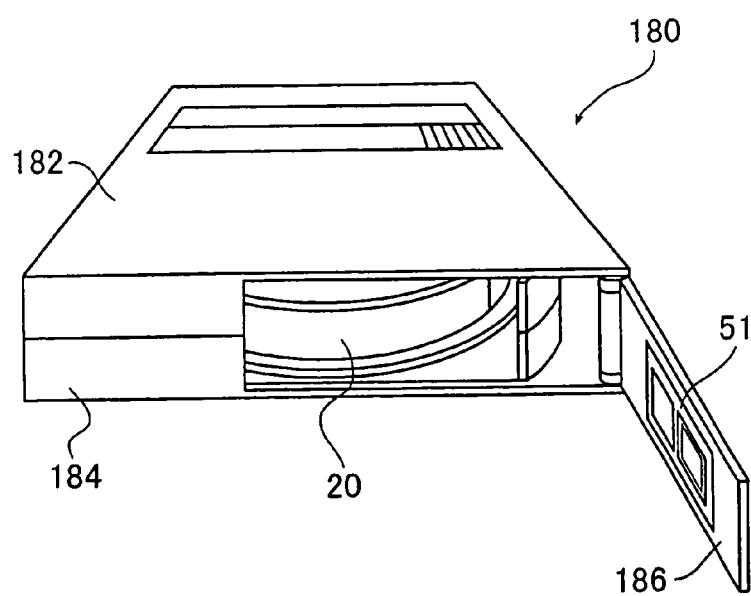
FIG. 17 is a perspective view of another embodiment of the 1-reel type magnetic tape cartridge according to the present invention, showing an example of attaching the non-contact memory device to the magnetic tape cartridge.

FIG. 17 shows a first embodiment of the eighth aspect of the present invention. FIG. 17 also illustrates a how the cartridge memory described above is attached to the magnetic tape cartridge of such a type that a single reel is wound with the magnetic tape and rotatably accommodated in the cartridge case.

As shown in FIG. 17, the magnetic tape cartridge 180 includes a cartridge case composed of a flat hard plastic and constructed such that a lower half 184 taking a plate-like square shape is joined via a joining members such as screws at four corners to an upper half 182 taking a plane configuration similar to the lower half 184 and superposed on the upper portion of the lower half 184. The single magnetic tape reel wound with the magnetic tape 20 is rotatably accommodated in this cartridge case.

A lid 186, for drawing out the magnetic tape 20, of which one side end is rotatably secured, is so provided at an opening formed in a frame body of the upper and lower halves as to be biased by a lid spring (not shown) in a closing direction of the lid 186. Then, the lid 186 is so constructed as to be unable to rotate by a lid lock (not shown) biased by a lid lock spring when the cartridge is unused.

In the magnetic tape cartridge 180 in this embodiment, the cartridge memory 51 is attached at an early stage of the manufacturing process to the underside of the lid 186 provided at the opening of the magnetic tape cartridge 180 described above. The cartridge memory 51 is attached through, e.g., the screws (unillustrated) by utilizing a space provided inside the data transmitting/receiving antenna 52 of the cartridge memory 51.

The thus constructed magnetic tape cartridge 180 in this embodiment is set in the dedicated recording/reproducing device (deck) at an arbitrary point of time, and the flap door opening device provided in this recording/reproducing device opens the lid 186 at the opening described above, with the result that the cartridge memory 51 attached to the underside thereof is exposed. The data can be thereby transmitted and received between this cartridge memory 51 and the data reading/writing unit provided in the recording/reproducing device.

Namely, in the magnetic tape cartridge 180 in the embodiment described above, the lid 186 provided at the opening is normally closed to protect the cartridge memory 51 from a damage given from the outside. When this magnetic tape cartridge 180 is set in the recording/reproducing device explained above, however, the lid 186 provided at the opening opens to get the cartridge memory 51 exposed, whereby the data can be transmitted and received with no trouble between this cartridge memory 51 and the data reading/writing unit provided in the recording/reproducing device without being influenced by an intermediary.

Herein, the contents transmitted to and received from the data reading/writing unit provided in the recording/reproducing device are mainly pieces of information given when producing (manufacturing) the magnetic tape cartridge 180, which will be touched in the following discussion and are to be recorded on the chip 54 in the cartridge memory 51. These pieces of information are read later on from the cartridge memory 51 as the case may be.

Figure 18:
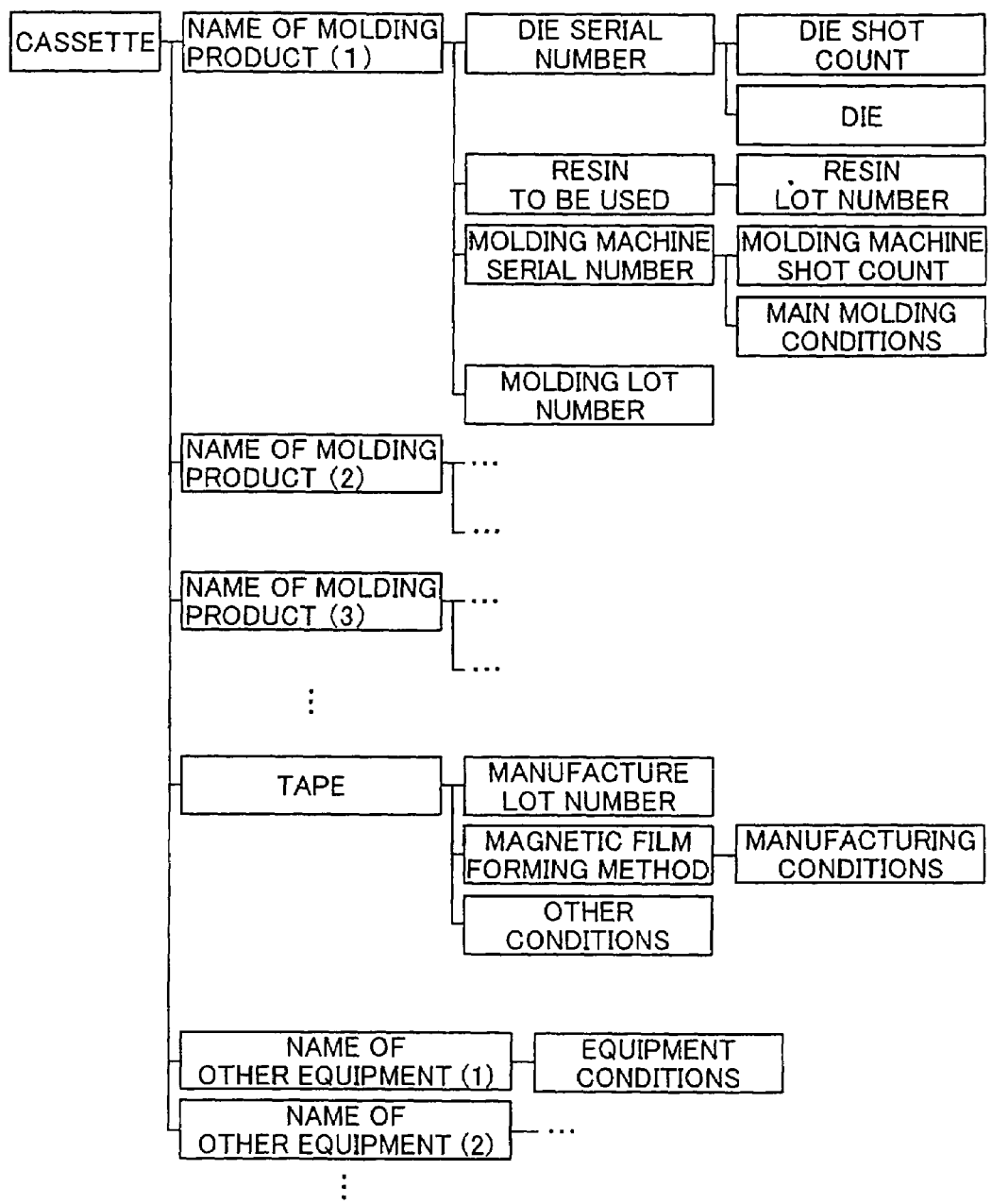
FIG. 18 is a diagram showing a tree structure used for selecting production conditions recorded on the non-contact type memory device used in the present invention.

Items of the information given when producing (manufacturing) the magnetic tape cartridge 180 may be related to a variety of conditions as shown in FIG. 18.

Referring to FIG. 18, a name of a molded product indicates a member (component) molded of a resin among the constructive elements of the magnetic tape cartridge 180. The items to be recorded are a serial number of the die used herein, a piece of information indicating which molded product among those made by this die, further, a classification and a lot number of the resin, a serial number of a molding machine and the like.

Moreover, subitemized conditions about a manufacturing lot number, a method of forming a magnetic film (magnetic recording layer) (by coating or vapor deposition) with respect to the magnetic tape loaded into the magnetic tape cartridge 180, may also be recorded.

As a matter of course, these production conditions may respectively be determined depending on an individual product, and what is given in FIG. 18 is nothing but one example.

Figure 19:
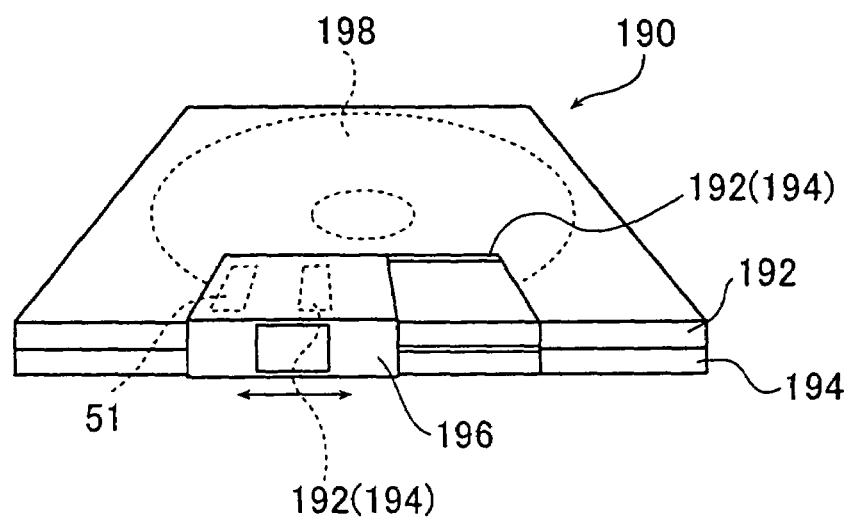
FIG. 19 is a perspective view of one embodiment of a disk type recording medium cartridge of the present invention, showing an example of attaching the non-contact memory device to the recording medium cartridge.

FIG. 19 is related to a second embodiment of the eighth aspect of the present invention, and shows how the cartridge memory 51 described above is attached to a magnetic disk cartridge 190 having a slide shutter similar to that of a so-called floppy disk. Herein, the magnetic disk cartridge 190 is constructed of an upper half 192 and a lower half 194, wherein a magnetic disk 198 is accommodated in between these casings 192, 194.

The upper and lower halves 192, 194 are formed with openings 192a, 194a facing to each other. Further, a shutter 196 slidable along slide grooves 192b, 194b formed in (upper and lower) surfaces of the upper and lower halves 192, 194, is provided astride these halves 192, 194. The shutter 196 is normally biased by an unillustrated spring in such a direction as to shut off the openings 192a, 194a.

Then, the cartridge memory 51 normally protected by the shutter 196 is attached in the vicinity of the opening 192a of the upper half 192. When the magnetic disk cartridge 190 is set in the recording/reproducing device, a shutter sliding device provided in the recording/reproducing device slides the shutter 196 to open the opening 192a, thereby exposing this cartridge memory 51 attached to the surface of the upper half 192 disposed thereunder.

In the magnetic disk cartridge 190 exemplified in this embodiment, the opening 192a is normally closed by the shutter 196, thus protecting the cartridge memory 51 from a damage given from outside. As explained above, however, when this magnetic disk cartridge 190 is set in the recording/reproducing device, the shutter 196 is slid to get the cartridge memory 51 exposed, whereby the data can be transmitted and received with no trouble between the cartridge memory 51 and the data reading/writing unit provided in the recording/reproducing device without being influenced by an intermediary.

In the magnetic disk cartridge 190 exemplified in this embodiment also, as in the case of the magnetic tape cartridge 180 shown in FIG. 17, the production conditions of the magnetic disk cartridge 190 are selected and recorded on the cartridge memory 51. A history of this product can be easily read at an arbitrary point of time in the subsequent processes (or even after being delivered).

Figure 20:
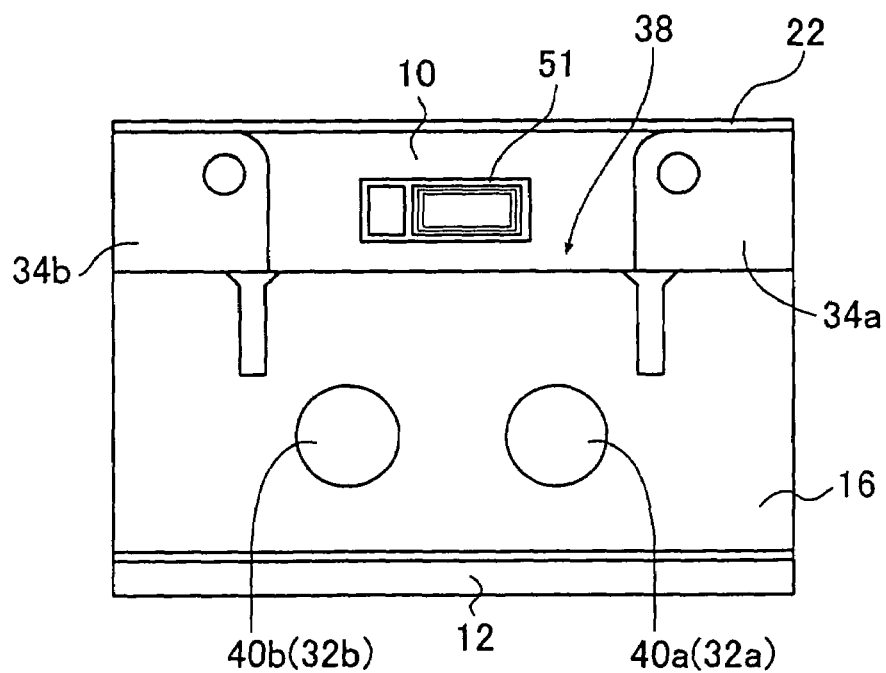
FIG. 20 is a view of a bottom surface of the magnetic tape cartridge shown in FIG. 1 by way of another embodiment thereof, showing an example of attaching the cartridge memory to the magnetic tape cartridge.

FIG. 20 is related to a third embodiment of the eighth aspect of the present invention, and shows how the cartridge memory 51 is attached to the magnetic tape cartridge shown in FIG. 1. In the magnetic tape cartridge shown in FIG. 20, the cartridge memory 51 is attached to a portion, corresponding to an opening 38 opened when the slider 16 slides back, of a lower surface (underside) of the upper half 10 of the magnetic tape cartridge. Note that the fitting of the memory 51 involves the use of an adhesive agent by utilizing a space provided inwardly of the data transmitting/receiving antenna 52 of the cartridge memory 51.

When the cartridge memory 51 is attached to the lower surface (underside) of the upper half 10 of the magnetic tape cartridge, it is desirable that a portion peripheral to a position for attaching the cartridge memory 51 be recessed as much as possible. This is because an unnecessary contact should be avoided during the running of the magnetic tape 20 in the magnetic tape cartridge.

In the thus constructed magnetic tape cartridge in this embodiment, the opening 38 is normally shut off by the slider 16. As explained above, however, when the magnetic tape cartridge is set in the recording/reproducing device, a tape loading device provided in the recording/reproducing device gets the slider 16 slid back, and the opening 38 appears. Then, the cartridge memory 51 attached to the underside of the upper half 10 of the magnetic tape cartridge is exposed, whereby the data can be transmitted and received without any trouble between the cartridge memory 51 and the data reading/writing unit provided in the recording/reproducing device.

In the magnetic tape cartridge in this embodiment also, as in the case of the magnetic disk cartridges 180 and 190 shown in FIGS. 17 and 19, respectively, the production conditions of the magnetic tape cartridge are selected and recorded on the cartridge memory 51. A history of this product can be easily read at an arbitrary point of time in the subsequent processes.

Figure 21:
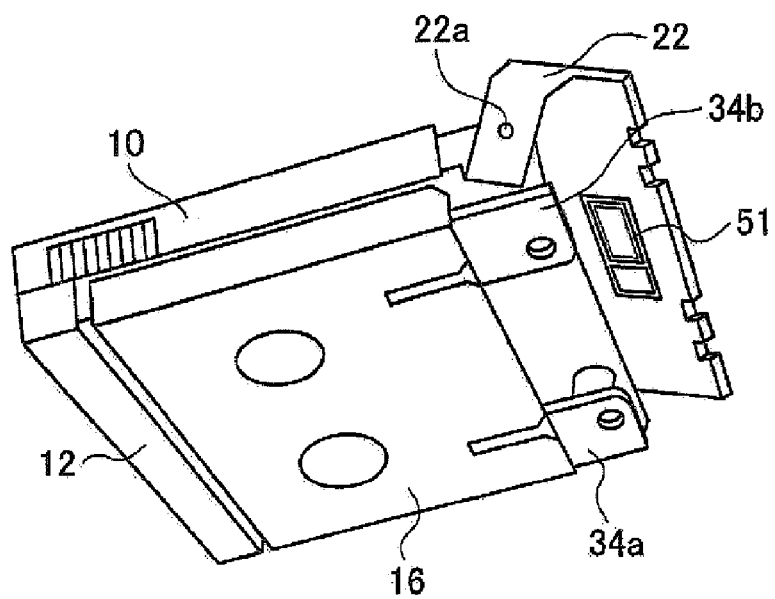
FIG. 21 is a perspective view of another embodiment of the magnetic tape cartridge shown in FIG. 1 as viewed from a bottom surface, showing an example of attaching the cartridge memory to the magnetic tape cartridge.
Figure 22:
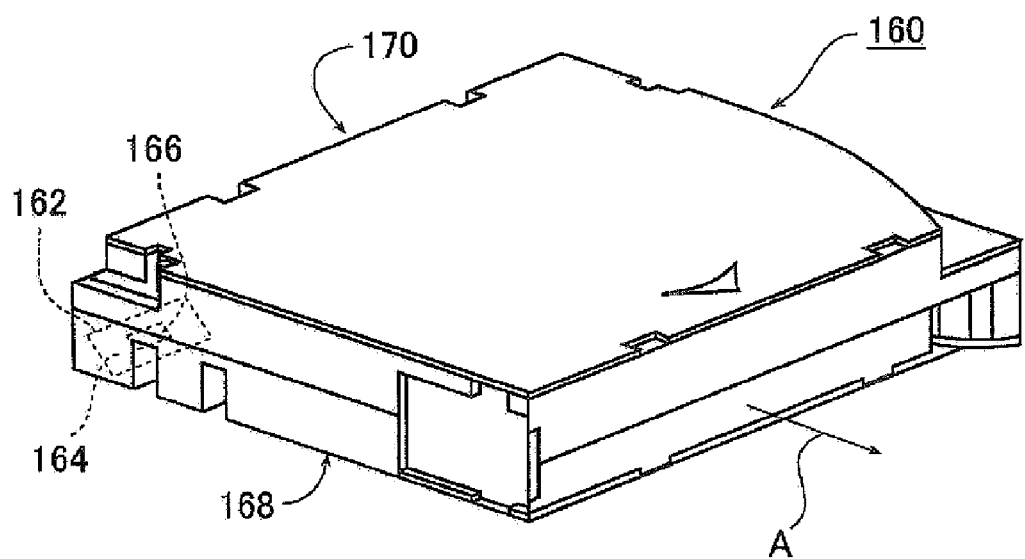
FIG. 22 is a perspective view showing one example of a conventional magnetic tape cartridge.

FIG. 21 shows a fourth embodiment of the present invention by way of another embodiment where the cartridge memory 51 is fitted to the magnetic tape cartridge shown in FIG. 1. A different point from the embodiment illustrated in FIG. 20 is that the cartridge memory 51 is herein attached to a rear surface (inside) of a front cover (lid) 22 rotatably fitted to the upper half 10 of the magnetic tape cartridge. Note that the fitting of the memory 51 involves the use of the adhesive agent as in the preceding embodiment.

Herein also, when the cartridge memory 51 is attached to the rear surface (inside) of lid 22 of the magnetic tape cartridge, it is desirable that a portion peripheral to a position for attaching the cartridge memory 51 to the rear surface (underside) of the lid 22 be recessed as much as possible. The reason is the same as the above, and it is that an unnecessary contact should be avoided during the running of the magnetic tape 20 in the magnetic tape cartridge.

In the thus constructed magnetic tape cartridge in this embodiment, the lid 22 is normally closed, thereby protecting the cartridge memory 51 from a damage given from outside. When the magnetic tape cartridge is set in the recording/reproducing device, however, the tape loading device provided in the recording/reproducing device opens the lid 22, and the cartridge memory 51 attached to the rear surface (inside) of the lid 22 of the magnetic tape cartridge is exposed, whereby the data can be transmitted and received without any trouble between the cartridge memory 51 and the data reading/writing unit provided in the recording/reproducing device.

In the magnetic tape cartridge in this embodiment also, as in the case of what has been exemplified in each of the embodiments discussed above, the production conditions of the magnetic tape cartridge are selected and recorded on the cartridge memory 51. A history of this product can be easily read at an arbitrary point of time in the subsequent processes.

Herein, the information on the method of forming the magnetic film (magnetic recording layer) (by coating or vapor deposition) among pieces of information given when the production takes places is recognized by the recording/reproducing device and needed for compensating signal waveforms through automatic equalizing.

It is to be noted that each of the embodiments discussed above is one example of the present invention, and the present invention should not, as a matter of course, be limited to these embodiments. For example, the cartridge memory 51 may be attached to the recording medium cartridge by utilizing methods involving the use of an adhesive double-coated tape other than the methods using the screws and the adhesive agent.

Further, the user of this recording medium cartridge is able to store the cartridge memory attached to the recording medium cartridge as the user intends with contents (such as a name of program, a name of picture, a location and a name of music) of the information recorded on the recording medium cartridge.

Moreover, the cartridge memory attached to the recording medium cartridge may be stored with information (protect information) indicating whether or not an access to the information recorded on the recording medium accommodated in the recording medium cartridge should be permitted. Still further, an IC chip used only for the protect information, which is different from the IC chip in the cartridge memory described above, may be provided, and the protect information may be read from and written to this IC chip for the protect information.

Note that the cartridge memory used in the eighth aspect of the present invention is not particularly restrictive as in the first through seventh aspects, and there can be used various types of cartridge memories such as the cartridge memory 51 shown in FIG. 3B, the cartridge memories 50, 84 and 150 shown in FIGS. 3A and 4 and other types of the cartridge memories.

As discussed above in details, according to the eighth aspect of the present invention, the cartridge memory attached within the recording medium cartridge is recorded with the information given when producing the recording medium cartridge, thereby obtaining a large effect in which it is possible to provide the recording medium cartridge capable of reading the information at an arbitrary point of time by use of the recording/reproducing device and reading the information given when producing the recording medium cartridge at an arbitrary point of time after recording.

More specifically, the various items of information given when in production have hitherto been managed by the individual database, and mappings of these pieces of information to the actually produced recording medium cartridges were made separately. Therefore, if some problem arises, the individual management database must be accessed. By contrast, however, the cartridge memory is fitted inside the recording medium cartridge and recorded with the detailed production conditions of the recording medium cartridge. The production conditions are read as the necessity may arise, thereby making it feasible to facilitate a variety of analyses.

Note that the detailed production conditions of the recording medium cartridge, which are stored in the cartridge memory, may be recorded in a data format convertible into a text format, whereby the data taken out can be easily utilized by a variety of software.

The recording medium cartridge in the eighth aspect of the present invention is basically constructed in the way described above.

The present invention has been discussed by way of the embodiments but may be modified in many forms within the range of the gist of the present invention, and these modifications are not excluded from the scope of the present invention.

What is claimed is:

1. A recording medium cartridge defined as a magnetic tape cartridge, comprising:
   a cartridge body;
   a tape reel accommodated in said cartridge body and wound with a magnetic tape, said tape reel having upper and lower flanges; and
   a non-contact type memory device disposed in a reel of at least one of the upper and lower flanges of said tape reel.

2. The recording medium cartridge according to claim 1, wherein said tape reel is a take-up hub wound with the magnetic tape, and
   a position provided with said non-contact type memory device is a position that does not impede tape winding and interfere with a reel driving shaft inserted into said cartridge body from a recording/reproducing device when using said magnetic tape cartridge, and impedes neither a rotation of this reel driving shaft nor a rotation of said take-up hub in a configuration and a structure of said take-up hub.

3. The recording medium cartridge according to claim 1, wherein said non-contact type memory device disposed in said tape reel is attached to a predetermined position within said tape reel by use of an adhesive agent, or fixed to a predetermined position by insert molding when molding parts.

4. The recording medium cartridge according to claim 1, wherein said non-contact type memory comprises an IC chip and a data transmitting/receiving antenna.

* * * * *